(12) United States Patent
Bassett et al.

US012440599B2

(10) Patent No.: US 12,440,599 B2
(45) Date of Patent: Oct. 14, 2025

(54) WATER ACTIVATED HYDROGEL-BASED MEDICAL PATCHES, AND METHODS OF MAKING AND USING SUCH PATCHES

(71) Applicant: Pramand LLC, Bedford, MA (US)

(72) Inventors: Michael Bassett, Hampton, NH (US); David Giusti, North Reading, MA (US)

(73) Assignee: PRAMAND LLC, Bedford, MA (US)

( * ) Notice: Subject to any disclaimer, the term of this patent is extended or adjusted under 35 U.S.C. 154(b) by 733 days.

(21) Appl. No.: 17/738,847

(22) Filed: May 6, 2022

(65) Prior Publication Data

US 2023/0355829 A1 Nov. 9, 2023

(51) Int. Cl.
*A61L 24/00* (2006.01)
*A61K 9/70* (2006.01)
*A61L 24/04* (2006.01)

(52) U.S. Cl.
CPC ............ *A61L 24/0031* (2013.01); *A61K 9/70* (2013.01); *A61L 24/0015* (2013.01); *A61L 24/0036* (2013.01); *A61L 24/043* (2013.01); *A61L 2400/04* (2013.01); *A61L 2430/36* (2013.01)

(58) Field of Classification Search
CPC ............ A61L 24/0031; A61L 24/0036; A61L 24/0015; A61L 24/043; A61L 2400/04; A61L 2430/36; A61K 9/70
See application file for complete search history.

(56) References Cited

U.S. PATENT DOCUMENTS

| | | |
|---|---|---|
| 5,410,016 A | 4/1995 | Hubbell et al. |
| 7,332,566 B2 | 2/2008 | Pathak et al. |
| 8,226,970 B2 | 7/2012 | Ahlers et al. |
| 8,302,323 B2 | 11/2012 | Fortier et al. |
| 8,383,161 B2 | 2/2013 | Campbell et al. |
| 8,431,114 B2 | 4/2013 | Kodokian et al. |
| 8,545,871 B2 | 10/2013 | Arthur et al. |
| 8,591,929 B2 | 11/2013 | Bennett et al. |
| 9,416,228 B2 | 8/2016 | Bender et al. |
| 9,629,798 B2 | 4/2017 | Senderoff et al. |
| 9,770,527 B2 | 9/2017 | Hoogenboom et al. |
| 9,868,822 B2 | 1/2018 | Bender et al. |
| 9,889,230 B2 | 2/2018 | Bennett et al. |
| 9,950,091 B2 | 4/2018 | Mousa et al. |
| 10,124,068 B2 | 11/2018 | Senderoff et al. |
| 10,232,077 B2 | 3/2019 | Bender et al. |
| 10,283,015 B2 | 5/2019 | Spotnitz et al. |
| 10,751,441 B2 | 8/2020 | Bender et al. |
| 10,925,996 B2 | 2/2021 | Hoogenboom et al. |
| 11,369,591 B2 | 6/2022 | Jarrett et al. |
| 2007/0077274 A1 | 4/2007 | Ahlers et al. |
| 2009/0069226 A1 | 3/2009 | Ong et al. |
| 2010/0100123 A1 | 4/2010 | Bennett |
| 2011/0045047 A1 | 2/2011 | Bennett et al. |
| 2011/0071227 A1 | 3/2011 | Ahlers et al. |
| 2011/0081398 A1* | 4/2011 | Sargeant ............. A61L 24/0031 523/113 |
| 2011/0251699 A1* | 10/2011 | Ladet .................... A61L 31/145 623/23.72 |
| 2012/0156164 A1 | 6/2012 | Park et al. |
| 2013/0004586 A1 | 1/2013 | Vachon et al. |
| 2013/0071462 A1 | 3/2013 | Jarrett et al. |
| 2013/0345319 A1 | 12/2013 | Messersmith et al. |
| 2016/0331738 A1 | 11/2016 | Jarrett et al. |
| 2019/0125922 A1 | 5/2019 | Bender et al. |
| 2019/0231923 A1 | 8/2019 | Hoogenboom et al. |
| 2021/0213157 A1 | 7/2021 | DeAnglis et al. |
| 2022/0143276 A1 | 5/2022 | Bassett et al. |

FOREIGN PATENT DOCUMENTS

| | | |
|---|---|---|
| AU | 2020312628 A1 | 1/2022 |
| AU | 2020312629 A1 | 1/2022 |
| BR | 112014022821 B1 | 3/2021 |
| ES | 2729787 T3 | 11/2019 |
| JP | 4422191 B1 | 2/2010 |

(Continued)

OTHER PUBLICATIONS

International Search Report and Written Opinion from corresponding PCT application No. PCT/US2023/020960, dated Sep. 21, 2023, 13 pages.
Adams et al., "Acute In-vivo Evaluation of Bleeding with GelfoamTM Plus Saline and Gelfoam Plus Human Thrombin Using a Liver Square Lesion Model in Swine", J Thromb Thrombolysis, vol. 28, pp. 1-5, (2009).
Geiger et al., "Collagen Sponges for Bone Regeneration with rhBMP-2", Advanced Drug Delivery Reviews, vol. 55, Issue 12, (Abstract only) 3 pages, (2003).

(Continued)

*Primary Examiner* — Shirley V Gembeh

(74) *Attorney, Agent, or Firm* — Christensen, Fonder, Dardi PLLC; Diane E. Bennett; Peter S. Dardi

(57) ABSTRACT

A medical patch can comprise a biocompatible substrate and a dry hydrogel precursor layer on the substrate, the dry hydrogel precursor layer comprising an electrophilic-hydrogel precursor having a plurality of electrophilic functional groups and a nucleophilic-hydrogel precursor having a plurality of protonated amine groups and no more than about 2 weight percent water. Both the electrophilic-hydrogel precursor and the nucleophilic-hydrogel precursor are substantially uncrosslinked, and are blended or in direct contact with each other. The medical patches can be formed by coating a melt blend of hydrogel precursors in a dry environment or based on solution coating from a dry, non-aqueous solvent, onto a porous, hydrophilic substrate. The medical patches can be used for placement over a bleeding wound or the like and may function as a hemostatic patch. Shredded patches and compositions mimicking a shredded patch can be placed into a wound defect.

39 Claims, 7 Drawing Sheets

(56) References Cited

FOREIGN PATENT DOCUMENTS

| WO | 2003063922 A1 | 8/2003 |
| WO | 2020264188 A1 | 12/2020 |
| WO | 2021009013 A1 | 1/2021 |
| WO | 2021009015 A1 | 1/2021 |
| WO | 2021009016 A1 | 1/2021 |
| WO | 2021018922 A1 | 2/2021 |
| WO | 2021101983 A1 | 5/2021 |

OTHER PUBLICATIONS

Lewis et al., "Clinical Effectiveness and Versatility of a Sealing Hemostatic Patch (HEMOPATCH) in Multiple Surgical Specialties", Expert Review of Medical Devices, vol. 15, No. 5, pp. 367-376, (2018).

* cited by examiner

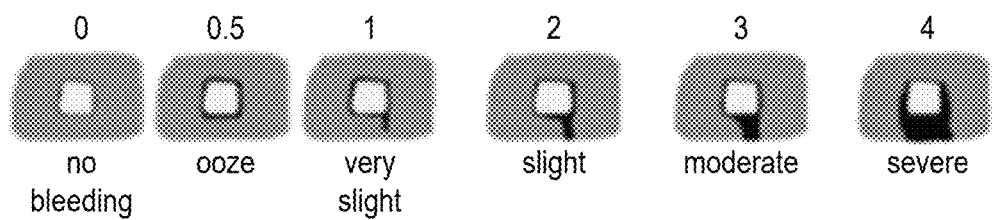
FIG. 9
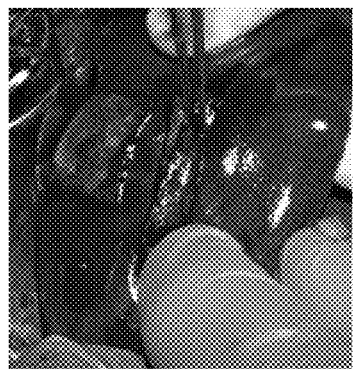 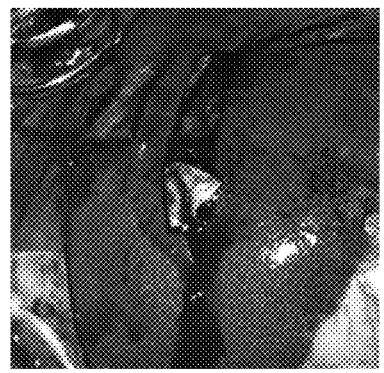
FIG. 10A    FIG. 10B

WATER ACTIVATED HYDROGEL-BASED MEDICAL PATCHES, AND METHODS OF MAKING AND USING SUCH PATCHES

FIELD OF THE INVENTION

The invention related to hydrogel-based medical patches, and more particularly to method of using such patches as hemostatic patches to control bleeding, surgical sealing, to facilitate healing, and for local drug delivery. The invention further relates to method of making the patches, such as forming melt blends that are cast onto a suitable substrate.

BACKGROUND OF THE INVENTION

Hydrogels have found a range of uses in medical applications for surgical sealing, drug delivery, tissue fillers, spacers, and the like. In the context of wound healing, hydrogel materials can provide a hydrophilic environment to isolate tissue and facilitate healing. For hemostatic and other wound healing applications, existing products have limitations that provide constraints on their effective use.

SUMMARY OF THE INVENTION

In a first aspect, the invention pertains to a medical patch comprising a biocompatible substrate and a dry hydrogel precursor layer on the substrate, the dry hydrogel precursor layer comprising an electrophilic-hydrogel precursor having a plurality of electrophilic functional groups and a nucleophilic-hydrogel precursor having a plurality of protonated amine groups and no more than about 2 weight percent water. Generally, both the electrophilic-hydrogel precursor and the nucleophilic-hydrogel precursor are substantially uncrosslinked, and are blended or in direct contact with each other.

In a further aspect, the invention relates to a medical patch comprising a biocompatible substrate and a dry hydrogel precursor layer on the substrate, the dry hydrogel precursor layer comprising a PEG-electrophilic hydrogel precursor having a plurality of arms having terminal reactive electrophilic groups and a PEG-nucleophilic hydrogel precursor having a plurality of arms having terminal protonated amine groups and no more than about 2 weight percent water. Generally, both the PEG-electrophilic hydrogel precursor and the PEG-nucleophilic hydrogel precursor are substantially uncrosslinked, and the dry hydrogel precursor layer forms a crosslinked hydrogel in no more than 5 minutes upon hydration with a physiological solution.

In another aspect, the invention relates to a method for forming a medical patch, the method comprising
applying one or more layers of a liquid onto a porous hydrophilic substrate in a dry atmosphere to form a hydrogel precursor layer on the porous hydrophilic substrate, wherein the hydrogel precursor layer comprises a blend of an electrophilic hydrogel precursor and a protected nucleophilic hydrogel precursor, or a stack of sublayers of, respectively, the electrophilic hydrogel precursor and the protected nucleophilic hydrogel precursor in which adjacent sublayers are directly contacting each other. The protected nucleophilic hydrogel precursor comprises an acidified amine, and the liquid comprises the electrophilic hydrogel precursor and/or the protected nucleophilic hydrogel precursor. The liquid comprises a melt or a non-aqueous solution of the electrophilic hydrogel precursor and/or the protected nucleophilic hydrogel precursor.

In other aspects, the invention pertains to a method for using a medical patch, the method comprising:
placing one or more medical patches on or in a bleeding defect associated with an organ, wherein the medical patch comprises a biocompatible substrate and an initially dry, substantially uncrosslinked hydrogel precursor layer on the substrate, wherein the layer comprises an electrophilic-hydrogel precursor and a nucleophilic precursor as a blend or in multiple stacked sublayers that directly contact each other.

In additional aspects, the invention pertains to a granular composition comprising a blend of a porous hydrophilic material and hydrogel precursors comprising an electrophilic-hydrogel precursor having a plurality of electrophilic functional groups and a nucleophilic-hydrogel precursor having a plurality of protonated amine groups and no more than about 2 weight percent water. Generally, both the electrophilic-hydrogel precursor and the nucleophilic-hydrogel precursor are substantially uncrosslinked and are in the same granules, or distinct granules, or a combination thereof. The granular composition can be placed in a bleeding defect where it undergoes gelation.

BRIEF DESCRIPTION OF THE DRAWINGS

FIG. 9 is an illustration of the Adam's Scale for defect bleeding scoring.

FIG. 10A is a photograph of an initial placement of a patch into a channel defect.

FIG. 10B is a photograph at 1 minute after the placement shown in FIG. 10A.

DETAILED DESCRIPTION OF THE INVENTION

Figure 1A:
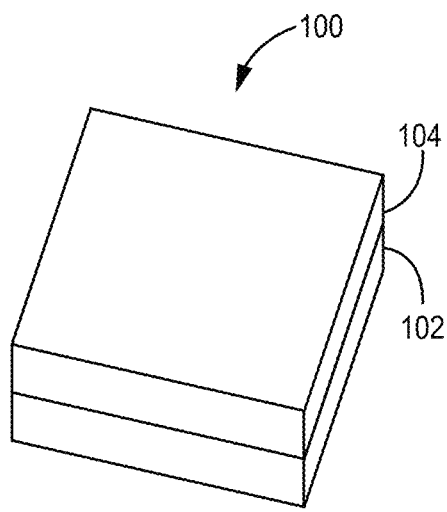
FIG. 1A is a perspective view illustration of a hemostatic patch structure.

Medical patches are formed having a dried layer of hydrogel precursors on a substrate, as a blend or as adjacent sublayers in direct contact, in which upon hydration with biological fluids results in the spontaneous crosslinking to form a hydrogel that can adhere to tissue. Generally, the hydrogel precursors do not need to react with blood or the tissue since any physiological fluid can activate the crosslinking involving reaction of equal or near equal amounts of nucleophilic functional groups and electrophilic functional groups. Processing to form the layer of hydrogel precursors generally is selected to avoid substantial crosslinking during processing through protection of the nucleophilic group and avoiding moisture even though the reactive species are in contact. Processing can comprise forming a dehydrated melt blend of the precursors that can then be coated or cast to form the layer or by coating a non-aqueous solution of the blend and removing the solvent. The substrate supporting the dried hydrogel can be selected to be absorbent so that the substrate further assists with a hemostatic function of the patch. The contact with the tissue during the crosslinking process can facilitate the formation of a desired adhesive bond whether or not any covalent bonding occurs with the tissue, and whether or not any blood is present. With selected components, the patches are foldable such that they can be delivered in laparoscopic procedures through a trocar and/or folded for insertion into a wound rather than over a wound. The surprisingly good adhesion provides for bonding along margins of the patch without a need for direct contact with blood or the wound. The results found with these patches indicate significant utility of the material also as a filler for a wound or the like, which can be formed from a shredded patch or an equivalently formed material where the components are separately shredded, pulverized or otherwise fragmented.

The dry layer of hydrogel precursors, such as a blend, generally comprises a first hydrogel precursor with a plurality of electrophilic functional groups and a second hydrogel precursor having a plurality of protonated amine groups, generally primary amines. In particular, the nucleophilic amines can be protonated to form a cationic ammonium group, which protects the amine from nucleophilic reaction until it is deprotonated. A halide, such as chloride, or other strong acid conjugate anion can be the counter ion. The electrophilic functional groups and the nucleophilic functional groups can react to form covalent crosslinks once the blend is hydrated and the ammonium group is deprotonated due to dilution of the acid upon hydration. Thus, in the patch product, the hydrogel precursors are substantially uncrosslinked, which is described further below. In some embodiments, the patches or portions thereof can be degradable. The precursors can be applied as layers that are distinct or as a pre-blended melt. In the event a melt is chosen, it is advantageous to use a melting point for the blended precursors such that it remains a solid at room temperature, so as to provide maximum storage stability. Precursor blends can comprise components that are liquid at room temperature but the blend has a melting point above room temperature. In principle, precursor blends can be viscous liquids at room temperature, but the resulting patches then may require refrigerated storage to ensure storage stability. The patches can be used for implantable applications or for exposed or cutaneous tissue healing. Substrates can be selected accordingly. The patches can be effective for hemostasis applications. For hemostasis applications, an absorbent substrate is highly desirable. Absorbent substrates can be formed from natural materials, such as collagen, gelatin, cellulose or the other similar biopolymers, or from synthetic hydrogels, such as polymers comprising poly(ethylene glycol), poly(vinyl alcohol), or other water soluble or water swellable synthetic polymers, or combinations with biopolymers. Substrates that are flexible and provide good drapability generally provide desirable patch properties, or substrates that are rapidly softened to become drapaable upon encountering moisture can also provide desirable properties for many applications.

In some embodiments, the precursor layer has no added buffers, and results clearly demonstrate rapid and good gelation without any buffer. Some appropriately selected buffer can be present without disrupting the function of the precursor layer. in this case, inorganic buffers can be desirable since they can remain in a separate phase until such time as activated with physiological fluids. Carbon dioxide from air or as present in a laparoscopic environment can dissolve into water to form carbonic acid, which can provide low amounts of buffer capacity. Carbonic acid evaporates as carbon dioxide rather than concentrating as water is removed. Inappropriately selected buffer can be undesirable either due to causing undesired premature crosslinking of the precursors prior to use or to slowing of the crosslinking after application to a tissue. While the water is removed from the patch during processing, trace amount of water may still result in some crosslinking if a higher pH buffer were present, and a more acidic buffer can slow crosslinking upon contact with a physiological solution, which generally have a mildly basic pH. Based on experience though with these polymer systems generally, phosphate buffer and perhaps other neutral to mildly acidic buffers can be used with moderate slowing of gelation. Evidence suggests that patches with no buffer can provide desirable performance with appropriate storage stability. Patches without significant added buffer or with acceptable levels of buffer can be perhaps more easily described in terms of the patch function, such as storage stability and speed to gel, which are described in detail below. If buffers are included, they can be placed, for example, as a powder on the substrate with the hydrogel precursor layer over them or blended into the hydrogel precursor layer if they are compatible with the non-aqueous formats of the precursor layer.

As described in more detail below and clearly exemplified, the patch has very good adhesion to wet tissue. Effective manufacturing approaches are described. The hydrogels are designed to have roughly equal amounts of electrophilic functional groups and nucleophilic functional groups so that full crosslinking can occur and is expected to occur between the hydrogel precursors without any precursors necessarily bonding to functional groups in blood or tissue. The strong adhesion of the patch with a lack of covalent bonds to blood or tissue is a surprising result based on teachings in the art. This improved design provides for excellent performance including, for example, strong adhesion and rapid gelation, while maintaining a good shelf-life. If it is desired to speed gel times, a buffer/accelerator solution can be applied, such as through the backing, shortly after to the patch is applied to the tissue to further speed the gelation process. While in principle, buffer/accelerator solutions can be added to the patch immediately prior to application to the tissue, this approach can result in gelling too rapidly such that good adhesion is not obtained.

The patches are particularly well suited to sealing of leaks or bleeding that is active. Such sealing is usually not possible with liquid precursors only when delivered as a sprayed on sealant due to the precursors being displaced by the active fluid egress. In the case of patch based sealants that are the subject of this invention, manual compression applied as part of the patch application, can temporarily control the active fluid egress and allow the sealant to activate and adhere to the tissue surface, thus forming an effective seal.

For some wounds, such as those that may have a cavity and not bleeding too severely, insertion of shredded patch material can be effective to stabilize the wound with the material crosslinking in place. Medical practitioners can shred a patch themselves for use, or a shredded patch material can be distributed in that form. To make a shredded patch composition, the patch does not need to be fully formed to produce a similar material. The substrate, such as a gelatin substrate, can be shredded, and the precursor blend can be formed and pulverized/reduced to fine particles. For example, a melt blend or solution can be spray dried/cooled to directly form a particulate type material that can be further milled or sifted, if desired. The separately shredded/pulverized materials can then be mixed for distribution and use. While forming a blend of the precursors for pulverizing can be desirable for rapid gelation/crosslinking, separate powders of the precursors can be blended as an alternative. The relative amounts of the components can follow the ranges as described for the patch, although slightly altered amounts may be selected for commercialization for these embodiments depending on clinical experiences.

A granular composition that is a blend of a porous hydrophilic material and hydrogel precursors can be prepared from a shredded patch, with the porous hydrophilic material being the substrate of the patch and the hydrogel precursors being the dry layer of hydrogel precursors on the substrate. The blend may be homogenous or non-homogenous. In some embodiments, the granular composition is a blend in which the porous hydrophilic material is sourced separately from the hydrogel precursors. For example, the porous hydrophilic material can be an uncoated substrate that has been shredded or a porous hydrophilic material that is provided in particulate form, such as gelatin microparticles or gelatin powder. In some embodiments, the porous hydrophilic material may be a foam, a non-woven tufted material, or a non-woven felted material. Two or more porous hydrophilic materials may be used together. Examples of distinct hydrophilic porous materials include, for example, substrates of the same material but with different porosity, pore size, and/or particulate size or substrates of different compositions. The hydrogel precursors can be provided as a blend of the electrophilic-hydrogel precursor and the nucleophilic-hydrogel precursor in the same granules, or as distinct granules of the electrophilic-hydrogel precursor and distinct granules of the nucleophilic-hydrogel precursor, or a combination thereof. In some embodiments, the weight ratio of the shredded substrate/porous hydrophilic material in the shredded patch composition can be from about 5 weight percent (wt %) to about 75 wt %, in some embodiments from about 7 wt % to about 50 wt %, and in further embodiments from about 10 wt % to about 35 wt %. In other embodiments, the weight ratio of the shredded substrate can be less than 25%, less than 10%. In other embodiments, a granular composition of the precursors can be used without any shredded substrate such that the shredded patch weight ratio is 0 wt %. A person of ordinary skill in the art will recognize that additional ranges of porous hydrophilic material composition within he explicit ranges above are contemplated and are within the present disclosure.

The granular composition can have granules which are composed of any combination of the porous hydrophilic material and the hydrogel precursors. Granules of different compositions can have different average granule diameters from each other. In one embodiment, the porous hydrophilic material and the hydrogel precursors form composites within granules. In another embodiment, the porous hydrophilic material and the electrophilic-hydrogel precursor form composites within granules and the nucleophilic-hydrogel precursor is in separate/distinct granules. In another embodiment, the porous hydrophilic material and the nucleophilic-hydrogel precursor form composites within granules and the electrophilic-hydrogel precursor is in separate/distinct granules. In another embodiment, the porous hydrophilic material is in granules and a composite of the hydrogel precursors are in separate/distinct granules. In another embodiment, the porous hydrophilic material, the electrophilic-hydrogel precursor, and the nucleophilic-hydrogel precursor are in separate/distinct granules. The granular composition may be provided as granules of the porous hydrophilic material which are coated or at least partially coated with one or both of the electrophilic-hydrogel precursor and the nucleophilic-hydrogel precursor. Coating of the precursor or precursors may be done by spraying of a melt or solution of the precursor or precursors. Multiple layers of coating may be applied, such as a layer of one precursor over a layer of a different precursor.

The granular compositions may have granules in a form ranging from a powder, to small particles, to course pieces, such as obtained by shredding of a substrate or patch. Small particles can have an average diameter from about 0.001 mm to about 5 mm or from about 0.01 mm to about 3.5 mm. The granules may or may not be approximately spherical and may be any reasonable shape. The granular compositions may further comprise a visualization agent and/or a therapeutic agent, as described for the patch. The granular compositions may be placed on or in a bleeding defect and pressure may be optionally applied. The bleeding defect may be partially or fully filled or thinly coated with the granular composition. A person of ordinary skill in the art will recognize that additional ranges of average diameters within the explicit ranges above are contemplated and are within the present disclosure. If a patch is shredded by a medical practitioner for use, the resulting patch fragments generally can have considerable variation in sizes and shapes according to the desires of the practitioner.

Due to the ability to have well mixed precursors, rapid gel formation is possible even though the amines are initially protected. Crosslinking is initiated as soon as the acid protected groups are neutralized upon dilution by physiological solutions. Physiological solutions are generally slightly basic with physiological pH, e.g., blood plasma, ranging from 7.32 to 7.42 pH units. For the PEG-NH$_2$ groups, the —NH$_3^+$ moieties should deprotonate to form the nucleophilic active forms even at neutral water pH values. Therefore, with proper hydration, the patches can gel in less than one minute, and the Examples demonstrate fast gelation. Due to the chemistry used, the patches generally adhere to any moist tissue surface with physiological solutions, and direct blood and/or wound contact is not needed, although can be present. The patches are designed for quick and predictable efficacy that can significantly help for performance of an efficient medical procedure.

The precursor compositions can be selected each to form a heat flowable composition without decomposing that can be blended as liquids. The heat flowable composition or the blend of two or more heat flowable compositions may be a neat melt or a neat melt blend, respectively, with "neat" referring to a liquid phase composition having no added solvent. The melt blend can then be coated onto the substrate and cooled to form the patch. In particular, precursors with polyethylene glycol cores generally form flowable liquids at relative low temperatures. Slot coating, extrusion, screen printing or other appropriate coating processes can be used to form the coated substrates. In some embodiments, the precursors can be soluble in some organic solvents in which the precursors are appropriately stable, such as aprotic polar solvents. A solution of the mixed precursors can be coated onto the substrate, such as spray coated, and the dried to remove the solvent. In alternative embodiments, the precursors can be processed using nonaqueous solvent solutions in which the solvents are selected to avoid deprotonating the acidified amine groups. The precursor solutions can be deposited using similar techniques as the precursor melts.

Medical patches can find significant value in closing wounds either within a patient as part of a procedure, or along the skin for wound healing or procedure closing, or other various uses. The present patches provide a significant advantage of activation by any physiological fluid such that contact with blood or tissue is not explicitly needed. Thus, even if part of the patch contacts directly blood or tissue, all of the patch can form an effective seal, even along the edges that may not directly contact blood or tissue. For example, an absorbent substrate can absorb physiological fluids and wet parts of the patch with physiological fluids along the entire patch surface. And direct contact with blood or tissue is not required for any part of the patch to adhere if there is appropriate moisture, so, for example, lymph fluids can effectively activate the patches, through direct contract or transfer from the substrate. The patches can be used for human or veterinary medical purposes. The patches as prepared can be free of blood components and human components.

The patch generally can have a substrate layer and a hydrogel precursor layer on the substrate layer, in which the precursor layer can be a blend of precursors and/or sublayers of the same and/or differing compositions. The substrate layer can be homogenous or it can be structured with multiple layers and/or structured layers. Generally, the substrate layer is dry when the patch is formed, and formed from a biodegradable material, although for certain applications, it can be desirable to use a non-degradable substrate. The substrate can be very absorbent of liquids, which can assist with management of blood and other fluids while the hydrogel is sealing the wound. The patches generally have sufficient thickness to provide desired mechanical integrity, but not excessively thick, and patches with appropriate thickness can provide for desired crosslinking and hydration in a desirable period of time as well as degrading in an appropriate time and not being excessively bulky.

The precursors can be selected to be processable using heat to form flowable states at appropriate temperatures. For embodiments in which the precursors are blended in a flowing state during processing, the formation of the melt blend should be thermally stable for each of the precursors. The processing can be carried out in a low moisture environment so that the hydroscopic materials do not absorb undesirable moisture from the air. Generally, the flow properties of the heated precursor compositions are strongly influenced by a polymer core from which the functional groups are pendent. In particular, polyethylene glycol based precursors have an advantage of relatively low flow temperatures and acceptance for approved implantable medical products, although other hydrophilic precursor cores can be used.

In some embodiments, the precursors can be blended in an organic solution if the precursors are soluble in appropriate organic solvents that do not induce crosslinking. Various solution coating techniques may be suitable for forming the precursor coating with the solution blends. After forming the coating, the organic solvent can be removed by evaporation to form a dry coating. After drying the patch can be packaged similarly to the cooled melt formed patches in water resistant pouch or the like.

To obtain desired shelf-life, appropriate handling and processing properties, and setting up upon application, the amine precursors are provided as acid salt/conjugates and the blended precursors can be free of buffers or only have appropriately selected buffers that do not slow gelling excessively or destabilize storage of the patches. The presence of basic pH buffers would tend to amplify instabilities to crosslinking during processing by potentially removing protons from the amine. While water is kept away during synthesis, with all of the hydrophilic components, it is not possible to get extremely low levels of water. On the other hand, the amines are selected to deprotonate readily upon contact with physiological fluids so that buffers are not needed to achieve rapid gelation.

Other hemostatic hydrogel patches are known. For example, fibrin based patches are available on the market. TACHOSIL® is a fibrin based patch from Baxter. Similar powders and syringe deliverable matrices based on Fibrin or other blood based components are also available. Another approach for patches involves partially crosslinking the hydrogel in the patch to leave unreacted electrophilic groups. The partial crosslinking provides for solution processing to make the hydrogel precursor layer of the patch with the precursors intentionally having a functional group ratio (deficient in nucleophiles) resulting in significant numbers of unreacted electrophilic groups. The unreacted electrophilic groups are intended to react with nucleophilic groups in blood or tissue at the wound site, such as naturally present amines. This approach has the disadvantage that the patch only adheres to tissue or blood so that edges of the patch away from direct wound interaction, as well as placement where direct contact with blood or tissue may not take place, can result in partial patch adhesion and/or poor patch adhesion. Hydrogels based on this approach have been described using polyoxazoline copolymers as the core of the functionalized precursors. See, published U.S. patent application 2019/0231923 to Hoogenboom et al., entitled "Cross-Linked Polymers and Implants Derived From Electrophilically Activated Polyoxazoline," incorporated herein by reference. These polyoxazoline based crosslinked polymers are described as adhesives and not explicitly described as hydrogels. In contrast, the hydrogels described herein result from all or essentially all of their crosslinking taking place after application and do not rely on reaction with tissue or blood or other nucleophiles supplied by the patent for crosslinking, although some reaction of the present precursors with blood or tissue could take place. Even though the hydrogel precursors for the instant patches effectively only react with themselves, they achieve excellent adhesion.

A polyethylene glycol-based (PEG based) hemostatic patch is sold under the tradename Veriset™ (Medtronic). It is believed that Veriset™ involves technology described in published U.S. patent application 2010/0100123A to Bennett, entitled "Hemostatic Implant," incorporated herein by reference. These patches involve separated precursor components. In contrast, the approach herein involves blended or strongly contacting hydrogel precursor components that can quickly form a highly crosslinked homogenous hydrogel in contact with the patient. As a result of the mixing or intimate contact of the uncrosslinked precursors, the hydrogels can gel quickly to form a homogenous hydrogel with good mechanical stability, good adhesion and predictable properties. Another hemostatic patch is sold with a PEG-based NHS hydrogel precursor under the name HEMOPATCH™ by Baxter International, Inc. (IL, USA). The precursor coating in the HEMOPATCH is intended to crosslink to amines in the tissue and blood.

Generally, Applicant's patches herein comprise a substrate and a hydrogel precursor layer. The crosslinking of the hydrogel precursor layer after placement on a tissue site serves to adhere the patch to the site. The substrate is generally adhered to the precursor layer and can serve to facilitate the hydration and stabilization of the patch in use, especially in hemostatic contexts. To these ends, the substrate generally is highly absorbent and porous, while maintaining mechanical integrity. In this way, the substrate can absorb fluids, such as blood, to help stabilize the site of the patch and to help hydrate the hydrogel to drive the crosslinking, while not being too porous such that blood passing through the substrate makes the surface of the substrate adhering, such as to gauze or a surgeon's glove. The substrate absorption can be evaluated based on the swelling, and the substrate can form a hydrogel, but a hydrogel that does not exhibit further crosslinking upon hydration. The porosity of the substrate generally allows some penetration of the hydrogel precursor into the adjoining substrate surface.

In the hydrogel precursor layers for the present patches, the two precursors for crosslinking can be mixed in a dehydrated state or formed as sublayers within the precursor layer. Amine groups are in a protonated acidic state. The precursor layer can be effectively free of buffer to support relatively more rapid crosslinking upon hydration with physiological fluids. The precursor layer is stable under dry storage for appropriate periods of time for product distribution with a commercially appropriate shelf-life. Of course, precursors can comprise trace amounts of anion contaminants, but appropriately pure precursors should eliminate any quality concerns. One or more amine terminated precursors may be used and one or more precursors reactive to nucleophilic end groups could also be used in forming patches that are described herein.

The crosslinking reactions involve nucleophilic amines reacting with an appropriate group to undergo an addition reaction. The addition reactions generally proceed at reasonable rates at higher pH values, generally pH 7 or higher. Without the use of an activation solution, the deprotonation of the amines can take place relatively quickly upon hydration with physiological solutions, which then allows for the crosslinking reactions to take place in a short period of time (eg. <3 min). Results in the Examples confirm the rapid gelation. Since the precursors are mixed or in intimate contact in the dry patch, the reactive crosslinking groups for can be nearby without large movement of macromolecular precursor molecules involved in the crosslinking. As described and exemplified below, the initially uncrosslinked precursors can gel quickly to induce adhesive forces of the patch. Generally, the use of a high pH buffer is not needed to induce gelation at appropriate rate, and such high pH buffers, such as a borate buffer, can contribute to shortened storage times. A low pH buffer, such as a phosphate based buffer, generally will lengthen gel times, but in appropriate amounts these may not slow gelation by an unacceptable amount. A low pH buffer may not adversely alter storage times. If so desired, to speed up reaction time, additional external higher pH buffers may be administered to the patch after placed on the patient for select applications, but is not required.

The substrate for supporting the hydrogel precursors can be absorbent, which can provide several advantages. First, it can absorb fluids, such as blood, lymph and the like, so that the health care professional can be assisted with the management of the wound while applying the patch. Also, the absorption of the physiological fluid by an absorbent substrate can help to hydrate the hydrogel precursors. So an absorbent substrate can speed the gel times, which can be less than a minute. The substrates generally biodegrade, although in some embodiments, the substrates can be non-degradable over relevant time scales, such as some applications involving external application of the patch. In cases where external use of the patch is envisioned, the backing substrate may not be biodegradable, and the patch can either be removed upon completion of healing or the hydrogel formed by the precursors in contact with tissue could be absorbable so as to release the patch substrate after a few days. In select cases it may be advantageous to deliver the hydrogel by itself and in such cases a non-porous backing substrate can be used, such that it can release the hydrogel on to the wet tissue without adhering to the hydrogel itself. In such applications substrates made from polymeric substrates that exhibit low adherence to the hydrogel precursors, such as poly tetrafluoro ethylene, poly ethylene, poly urethane, and the like, can be useful. Release layers for adhesive bandages and the like may be adapted for this use.

The protected nucleophilic precursor generally has an acidified amine group. For example, the amines can be reacted with a strong acid, such as hydrochloric acid, and the chloride ion or other corresponding conjugate base can remain associated with the precursor. The acidification of the amines stabilizes the precursor layer by inhibiting the crosslinking reaction until the amine can deprotonate. Through this selection of the precursors, the resulting patch can be stable in dry storage for considerable period of time. The nucleophilic precursors generally have a plurality of functional groups and three or more groups can allow for a more highly crosslinked structure. The nucleophilic precursors can have a hydrophilic core, which can be highly branched with pendant amine groups. A low pH buffer may not destabilize the acidified amine group.

The electrophilic precursors have electrophilic groups that can undergo addition reactions with the amines to form covalent crosslinks. The electrophilic groups generally only react with amine groups and not with the protonated amine groups, ammonium acid conjugates. The electrophilic precursors have a plurality of functional groups, and with three or more functional groups can form a highly crosslinked hydrogel. The electrophilic groups are generally pendant off of a hydrophilic core, such as polyethylene glycol, that can be appropriately branched to form the desired degree of crosslinking.

The electrophilic precursors and the protected nucleophilic precursors can be designed to have flow temperatures lower than the decomposition temperatures for either precursor. Thus, a melt blend can be formed with the two compounds. The melt blends can be formed as a good mixture. The melt blends can then be processed to form the patches. If the precursor layer comprises sublayers, these can be applied sequentially over each other. A sublayer can comprise a blend or one of the precursors. Generally, the processing can be performed under low humidity conditions to reduce any absorption of moisture from the ambient atmosphere. The melt blends can be directly formed into a coating for a patch, although the melt blend could in principle be solidified for later processing. For example, the melt blend can be slot coated onto a substrate, although other process techniques could be used, such as extruding, screen printing, spraying, or the like. Slot coating or other coating techniques can be performed on a sheet of substrate for efficient processing. After the coating solidifies, the coated sheet can be cut into desired patch sizes. Alternatively, the coating can be formed on pre-cut patch substrates. Appropriate packaging can be used for distributing the patches to remain in a dehydrated state.

In some embodiments, the precursors can be soluble in inert organic solvents. Suitable solvents can be aromatic liquids, such as toluene, xylene, dimethyl carbonate, or the like, or aprotic solvents. Generally, the solutions can be highly concentrated to reduce solvent use as long as the fluid properties allow for appropriate processing. Coating approaches for the solvent based deposition generally can be the same as for the melt blends, and concentrations can be adjusted as appropriate for a particular deposition approach.

The components of the patch tend to be hydrophilic and/or hydroscopic. Thus, the components after synthesizing or purchasing can be dried/desiccated prior to processing to form the patch. Some substrates can be lyophilized. It can be desirable to get hydration levels to no more than 5 weight percent or significantly lower in some embodiments. Processing can take place in a controlled atmosphere under dried air, nitrogen or the like, with application of heat and vacuum. Processing may include sweep techniques employing restricted streams of inert dry gas in combination with heat under partial vacuum to enhance drying. Conditions can be provided for reduction of moisture After forming the patch, it can be packaged under dried air into a moisture resistant package. The patch can be sterilized, for example, using ethylene oxide gas during packaging or with radiation after packaging. Sterilization can be under conditions that do not induce significant amounts of crosslinking.

The hydrogel patches described herein are particularly well suited for use as implantable hemostatic patches that can be absorbed after a reasonable period of time ranging from days to a month or longer. The hydrogel patches can be used to control bleeding or to seal a wound for open surgeries or laparoscopic procedures. The hydrogel patches can be used generally for any wound healing context, including superficial, rather than implanted, placement. The properties of fast sealing, good adherence and tunable absorption times provide desirable features for a range of applications.

Patch Structure and Hydrogel Precursors

The hydrogel precursor patches described herein generally comprise a substrate and a layer hydrogel precursors, as a blend or sublayers, on a surface of the substrate, although typically with some penetration into the substrate. The substrate can be selected to be suitable for a desired application of the patch. Generally, the substrate is absorbent, and the substrate can be absorbable in situ in a reasonable time period in contact the patient. The patch can be suitable for implantation in a patient, and for these embodiments, the substrate generally is absorbable. The precursors are generally substantially uncrosslinked and blended within a layer. The layer can be uniform over the substrate or variable. The precursors are selected to crosslink relatively quickly on exposure to physiological solutions or tissue. The patch can be suitable as a hemostatic patch that helps to control and limit bleeding.

In the patch prior to use, the hydrogel precursors in the layer on the substrate are not substantially crosslinked. Precise quantification may not be practical but clear significance of the concept and satisfaction of these conditions is very clear. First, the chemistry is designed so that crosslinking would not be expected due to protection of the amine groups by acid modification that serves to block nucleophilic reactions. Significant crosslinking results in the joining of the various precursor molecules into a network structure. At a certain degree of crosslinking, the material ceases to have independent precursor molecules and becomes essentially a cohesive mass of material linked together with covalent bonds. This process is evaluated in the context of gelation and the cohesive mass can be referred to as the resulting gel, which in this case is a hydrogel. As the degree of crosslinking of the hydrogel precursors increases beyond gelation and toward full crosslinking over additional time, there is a strengthening and firming of the gel. The gelation time (or gel time) can be measured, for example, as described below. Conversely, at intermediate times prior to gelation, the properties change as some crosslinking occurs, which changes the behavior of the composition. If the precursors are substantially uncrosslinked, the properties of the fully hydrated precursors are not significantly altered, and flow properties and rheology do not measurably change for the precursor composition relative to the as formed uncrosslinked composition, although these properties can change quickly once crosslinking is allowed to begin.

FIG. 1A illustrates the structure of one embodiment of a hemostatic patch. Hemostatic patch 100 has substrate 102 and precursor layer 104. Substrate 102 may be a gelatin substrate or other suitable substrate as described below. For example, substrate 102 may be a gelatin substrate without added blood components such as fibrinogen or thrombin or platelets. In some embodiments, substrate 102 is porous and absorbent. In additional or alternative embodiments, substrate 102 is biodegradable. Generally, the substrate is relatively thin, such as no more than a centimeter in average thickness, and the area of the patch can be selected as appropriate for the particular application.

Figure 1B:
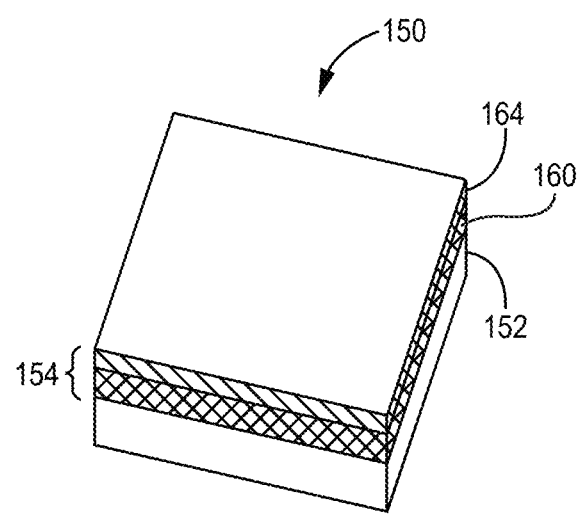
FIG. 1B is a perspective view illustration of a layered hemostatic patch structure.

Precursor layer 104 can be a blend of an electrophilic-hydrogel precursor and a nucleophilic-hydrogel precursor. Alternatively or additionally, precursor layer 104 can be structured as sublayers of an electrophilic-hydrogel precursor and a nucleophilic-hydrogel precursor, which may or may not comprise blends but generally with an interface of electrophilic-hydrogel precursor and nucleophilic-hydrogel precursor along the sublayers. In some embodiments, the sublayers applied to the substrate as a liquid form a single homogeneous layer on the substrate after cooling and/or drying. In other embodiments, the sublayers form a continuous layer which has a composition gradient. FIG. 1B illustrates an alternative structure of a hemostatic patch. Hemostatic patch 150 has substrate 152 and precursor layer 154. Precursor layer 154 is structured as a stack of sublayers 160 and 164. Sublayers 160 and 164 directly contact each other. In some embodiments, sublayer 160 is a sublayer of an electrophilic-hydrogel precursor and sublayer 164 is a sublayer of a nucleophilic-hydrogel precursor. In other embodiments, the composition of the sublayers is reversed and sublayer 160 is a sublayer of a nucleophilic-hydrogel precursor and sublayer 164 is a sublayer of an electrophilic-hydrogel precursor. In some embodiments, precursor layer 154 is structured as three or more alternating sublayers, such as sublayer 160/sublayer 164/sublayer 160, with adjacent sublayers in direct contact with each other. As used herein throughout, direct contact between hydrogel precursors indicated more than incidental or inadvertent contact involving a substantial surface area of the respective components along an expanded dimension of a layer, and generally, this would involve a layer on layer interaction. Multiple sublayers may be the same thickness or different thicknesses. In some embodiments, precursor layer 104/154 has a visualization agent so that precursor layer 104/154 is visually distinguishable from substrate 102/152. In preferred embodiments, precursor layer 104/154 has a blue or green coloration due to the presence of dye.

The dimensions of the hydrogel precursor patch can be selected to be suitable for appropriate applications. Furthermore, the overall thickness is split between the substrate thickness and the hydrogel precursor thickness. In this paragraph and the following paragraph, dimensions refer to the dimensions of the dry patch, and swelling from hydration is discussed further below. The area of the patch is generally not particularly limited and can be selected based on the desired placement of the patch. For commercial application, different sizes can be distributed for selection by the user. Practical constraints generally would suggest patch areas of no more than 20 centimeters (cm)×20 cm for human patients, although larger patches could be used, and within these values, any smaller ranges could be selected, such at 5 cm×5 cm, 10 cm×5 cm, 2 cm×4 cm, etc. Convention may suggest certain dimensions for certain applications. Different sizes can be sold for selection of a desired size by the health care professional. In general, patches can also be cut to size using instruments available in an operating room environment to meet particular situations encountered.

A thickness of a patch may depend on balancing ability to flex the patch to conform to an application site and the ability to absorb a desired amount of fluid, along with resorption times. Thicker patches may be less flexible and may take longer to hydrate and to degrade, while thicker patches can absorb more blood and other fluids. Similarly, thinner patches generally absorb less, may be more flexible and may degrade faster, shortening persistence times. The crosslinking hydrogel precursor layer generally provides all or a majority of the adhesion of the patch during the initial application of the patch. The substrates can be selected to provide a significant amount of absorption of fluids. In some embodiments, patch may have a dry thickness from about 0.5 mm to about 10 mm, in further embodiments from about 0.6 mm to about 8 mm, and in other embodiments from about 0.75 mm to about 6 mm. Substrate 102/152 and/or precursor layer 104/154 individually can have a thickness from about 0.25 mm to about 8 mm, in further embodiments from about 0.35 mm to about 7 mm, and in additional embodiments from about 0.5 mm to about 5.5 mm. While in general, the patch can have these ratios of thicknesses for the substrate and hydrogel precursor coating, in some embodiments, it is desirable for the dry substrate to be at least as thick as the dry hydrogel precursor layer, and in further embodiments at least about 60% in some embodiments from 65% to 90% of the dry patch thickness is the substrate thickness. For ease of measurement, the substrate thickness includes any hydrogel precursors that penetrate into the substrate. A person of ordinary skill in the art will recognize that additional ranges of dimensions and thicknesses within the explicit ranges above are contemplated and are within the present disclosure. Generally, the hydrogel precursor layer can be added without significantly detracting from the porous, absorbing nature of a substrate material.

Suitable substrates can be formed in principle from natural materials, synthetic materials or a combination thereof. Synthetic materials for absorbent substrates include for example, polyesters, polyurethanes, high molecular weight polyethylene oxide (PEO), or other reasonable synthetic polymers. Resorbable polyesters include, for example, poly (lactic acid), poly(glycolic acid) or copolymers thereof. High molecular weight PEO can dissolve slowly in water. Natural materials are generally processed appropriately for inclusion in medical products, so they are generally modified to varying degrees from their natural form. Nevertheless, natural materials can provide desired properties suitable for the substrate, including high absorption of aqueous solutions and degradation in in vivo applications in reasonable period of time. Suitable natural materials include for example, polysaccharides and materials derived from extracellular matrix proteins. For example, polysaccharides that are derivatives of cellulose, pectin, hyaluronic acid or chitosan can be used for making absorbent sheets. Commonly used materials are forms of cellulose that include, for example, ester and ether derivatives, such as cellulose acetate, or ethylcellulose. Oxidized cellulose is a material that aids in hemostasis, but this material is generally believed to be poorly absorbed and may cause postoperative complications, and hydroxycellulose, nitrocellulose or other forms can be appropriate.

Collagen is an extracellular matrix protein that in native form can be found in triple stranded fibrils. Purified collagens can take various forms, and gelatin is a partially hydrolyzed form of collagen. Collagen can be derivatized on other ways, if desired. Highly absorbent and absorbable collagen sponges have been developed, and these can be used alone as hemostatic members. Commercial versions are sold, for example, under the Trademarks Avitene™ MCH and Avitene™ Ultrasponge by Becton, Dickinson and Company. Gelita Medical GMBH sells gelatin (collagen based) hemostatic materials that can provide the basis for patch substrates. Custom substrates can be formed using commercially available medical grade collagen or gelatin (e.g., from Gelita Medical or other supplier) formed into a sheet, optionally with crosslinking, such as glutaraldehyde crosslinking, and dried, such as lyophilized. While glutaraldehyde crosslinking can stabilize the collagen, strong glutaraldehyde crosslinking can significantly increase persistence times.

Gelatin can be thermally crosslinked to mechanically stabilize the material suitable for a substrate. The length of thermal crosslinking again influences the persistence times. Prior to crosslinking, the gelatin is placed in the desired shape and then heated. In general, thermal crosslinking can be performed at temperatures from about 100° C. to about 200° C., and in further embodiments from about 120° C. to about 180° C. for time from about 15 minutes to about 4 hour and in further embodiments from about 25 minutes to about 3 hours. A person of ordinary skill in the art can adjust the time and temperature to achieve desired properties, such as porosity, and mechanical stability along with persistence times after in vivo implantation, which are discussed further below. Using the thermally crosslinked gelatin material, the substrate can be a foam, a non-woven tufted material, or a non-woven felted material. A person of ordinary skill in the art will recognize that additional ranges of temperatures and times within the explicit ranges above are contemplated and are within the present disclosure.

Since the components of the patch tend to be hydrophilic and/or hydroscopic, the components can be dried/desiccated prior to processing to form the patch. Suitable drying techniques can comprise, for example, drying under vacuum, drying under heat, drying under a desiccant, lyophilization, or the like, or combinations thereof. It can be desirable to get hydration levels to no more than 5 weight percent water, in further embodiments, no more than about 3 weight percent, in further embodiments no more than about 2 weight percent, or significantly lower in some embodiments. Water content can be determined by coulometric titration (Karl Fischer) or loss on drying methods. A person of ordinary skill in the art will recognize that additional ranges within the explicit ranges above of moisture content are contemplated and are within the present disclosure.

The hydrogel precursors can be selected to provide desirable absorption and crosslinking in contact with physiological solutions while remaining stable as the coating during storage under dry, generally refrigerated, conditions for an appropriate shelf-life, such as at least two months and in some embodiments at least about six months. The nucleophilic group can be a protonated amine in which the acidic amine in its protonated form is protected from crosslinking reactions. Suitable electrophilic groups crosslink with unprotonated amines when in contact in the same phase, whether co-melted in a mixture or dissolved in a solvent, which generally have a pH of at least about 7.1, that deprotonate the in initially protonated amines.

With respect to buffers, the hydrogel precursors are not considered to be buffers whether or not they alter the pH and may, in principle, provide some buffer function. The amine precursors are provided in an acidified form with the acidic proton functioning as a protecting group blocking crosslinking. Upon contact with a bodily fluid at physiological pH, the acidified amine can be deprotonated so that it can crosslink with the electrophilic precursor. The layer of uncrosslinked precursors may not include any significant added buffer, and desirable patch performance is found with no added buffer. A buffer can be considered as any Brnsted base, which generally would be an anion ($B^-$) corresponding to a weak acid (HB). Anions corresponding to strong acids, such as halide anions, do not act as aqueous buffers, and the amine precursors are generally provided as HCl salts or similar strong acid analogs.

Generally, pH is used to gate the crosslinking reaction, and the amines are provided in acidified form which inhibits crosslinking. Thus, the avoidance of high pH buffer in the precursor layer avoids any premature crosslinking reaction through activation by a buffer. As physiological fluid permeates the patch upon use, the pH change induced by the physiological fluid rapidly deprotonates the amine and induces crosslinking. Since the precursors are mixed or in direct contact in the dry patch, the precursors can crosslink rapidly and with a relatively high initial crosslinking density to provide good adherence without needing to wait longer for more complete crosslinking. Gel times are described further below.

In hydrogel systems, suitable functional groups for crosslinking monomers to form adhered patches in situ may be advantageously used, including monomers, generally macromers as specified below, that contain electrophilic groups that demonstrate activity toward amine functional groups. Thus, multi-component hydrogel systems can spontaneously crosslink when the components are activated by contact with physiological liquids, but the two or more components are appropriately stable for a reasonable process time before activation by the physiological liquids. Such systems include, for example, monomers (generally, although not necessarily, macromers) that are di- or multifunctional number of amines in one component and macromers with di- or multifunctional number electrophilic groups, such as N-hydroxysuccinimide ester containing moieties, in the other component. N-hydroxysuccinimide ester functional groups facilitate amide bond formation in reactions with amines and have been used in other medical hydrogels, although other suitable electrophilic precursors are described below. The N-hydroxysuccinimide esters are generally pendent on a hydrophilic core.

The hydrogel precursors can have crosslinking activated by the physiological fluids contacted by the precursors following delivery. The hydrogel precursors described herein can be designed to hydrate relatively quickly. Hydrogel and precursor solution properties are described further below. The parameters that influence the properties include: functional group chemistry, crosslinking density/molecular weights of the monomers, monomer composition, substrate composition, and patch structure.

The crosslinking density of the resultant biocompatible crosslinked polymer is controlled by the overall molecular weight of the macromers and the number of functional groups available per molecule. A lower molecular weight between crosslinks such as 600 Da give a higher crosslinking density as compared to a higher molecular weight such as 10,000 Da. Higher molecular weight macromers with significant branching provide desirable gelatin times, and in some embodiments more than 2500 Da so as to obtain elastic gels. In certain embodiments, the nucleophilic acid conjugated polymer (with an amine) is not significantly smaller in molecular weight than the electrophilic one. In some embodiments, it is the same size or larger.

The crosslinking density also may be controlled by the ratio of nucleophilic groups and electrophilic groups in the mixed precursor material. For the dry solid precursor layer, the gel times depend significantly on the time to hydrate since the crosslinking reactions can take place in water and since the amines deprotonate to be available for nucleophilic substitution. A rapidly hydrating substrate can help to hydrate the dried hydrogel precursors, and size of the hydrophilic cores in the precursor molecules can influence hydration times. While not wanting to be limited by theory, it is thought that longer gel times can be related to slower diffusion of physiological fluids into and/or slower diffusion of the acid conjugate species out of in situ placed patches. Yet another method to control crosslink density is by adjusting the stoichiometry of nucleophilic functional groups to electrophilic functional groups. A one to one ratio of electrophilic groups and amine groups should provide for a highest crosslinking density, although electrophilic groups in the precursors can react, in principle, with amines in proteins in physiological solutions as well as in the tissue. In the Examples, desirable performance is obtained with a 1:1 ratio of functional groups.

Monomers

Monomers capable of being crosslinked to form a biocompatible structure, e.g., an implant, may be used. As noted above, monomers can be macromers, which may or may not be polymers. The term polymer, as used herein, means a molecule formed of at least three repeating groups, which then may have reactive functional groups pendent on the polymer. Generally, the term "reactive precursor species" means a polymer, functional polymer, macromolecule, or small molecule that can take part in a reaction to form a network of crosslinked molecules, e.g., a hydrogel. As noted above, for the formation of rapidly crosslinking hydrogel precursor systems, the monomers are generally, although not necessarily, macromers, as specified below since macromers generally allow for more rapid hydration along with more rapid deprotonation of the amines.

Monomers may include, for example, the biodegradable, water-soluble macromers described in U.S. Pat. No. 7,332,566 to Pathak et al. (hereinafter the '566 patent), entitled "Biocompatible Crosslinked Polymers With Visualization Agents," incorporated herein by reference. These monomers are characterized by having at least two polymerizable groups, and may or may not be separated by at least one degradable region. Upon crosslinking, the product polymers form coherent hydrogels that persist indefinitely or until eliminated by degradation, which can involve, for example, enzymatic reactions or hydrolysis. Generally, a macromer is formed with a core of a polymer that is water soluble and biocompatible, such as a polyalkylene oxide, e.g. polyethylene glycol, which can be flanked by hydroxy-carboxylic acids such as lactic acid, to form degradable esters or non-degradable amides. Suitable monomers, in addition to being biocompatible, and non-toxic, also can be at least somewhat elastic after crosslinking or curing. For the electrophilic compounds or compounds with amine groups, the cores of the compounds can have a plurality of arms or branches each with a functional group suitable for crosslinking. PEG-based polymers with three or more arms are generally star polymers with a branched core with the extending PEG polymer arms. As noted above polyethylene glycol (PEG) based monomers are established medical hydrogel precursors, and precursor compounds are commercially available with various numbers of arms, molecular weights and functional groups.

The nucleophilic functional groups generally are amine groups. The amine groups can be protonated as a protecting group or gate to control crosslinking. The nucleophilic amine groups of the precursors can be designed to significantly deprotonate at physiological pH values, such as from about 7.1 to about 7.6 pH units, although blood and tissue generally is at a narrower pH range in a healthy individual. While macromers are exemplified and provide desirable properties, trilysine has been used in medical hydrogels as a poly-amine monomer, and similar compounds can be used. The electrophilic functional groups can be selected to react in addition reactions with the amines to form crosslinks. N-hydroxylsuccinimide esters are desirable electrophilic groups, although other suitable groups are described below. One or both of the functional groups can be pendent on a hydrophilic core, which can help to provide desired swelling with liquid upon hydration. In some embodiments, the polymers may have a hydrolytically biodegradable portion or linkage, for example an ester, carbonate, or other suitable linkage, although enzymatically degradable linkages may be present additionally or alternatively. Several such linkages are well known in the art and originate from alpha-hydroxy acids, their cyclic dimers (anhydrides), or other chemical species used to synthesize biodegradable moieties, such as, glycolide, dl-lactide, 1-lactide, caprolactone, dioxanone, trimethylene carbonate or a copolymer thereof. In particular, the electrophilic monomers can conveniently be provided with degradable linkages.

Generally, the monomer providing electrophilic functional groups and the monomer providing the amine groups are macromers to provide for more rapid hydration of the dry precursor layer. The macromers generally have biologically inert and water soluble cores with pendent reactive functional groups for crosslinking. When the core is a polymeric region that is water soluble, polymers that may be used can be natural or synthetic polymers. Suitable polymers for the core can include polyethers, for example, polyalkylene oxides such as polyethylene glycol("PEG"), polyethylene oxide ("PEO"), polyethylene oxide-co-polypropylene oxide ("PPO"), co-polyethylene oxide block or random copolymers, poloxamers, such as Pluronic® F-127; as well as polyoxazolines, polyvinyl alcohol ("PVA"); poly (vinyl pyrrolidinone) ("PVP"); and polysaccharides, such as hyaluronic acid, chitosan, dextran or digested cellulose and derivatives thereof. Based on extensive experience in existing medical products, star-branched polyethers and more particularly polyethylene glycol (also known as poly(oxyalkylenes) or poly(ethylene oxide)) are especially suitable. Acidified amines or electrophilic groups can be located at the end of the arms of each branch or a portion thereof. For PEG precursors, a common notation in the medical hydrogel art is to refer to the number of arms and molecular weight along with the functional groups on the arms, such as 4A15K $NH_2$—HCl for a 4 arm PEG with a 15,000 Daltons molecular weight and acidified amine with chloride ions or 8A20K NHS ester, for an eight arm PEG with a molecular weight of 20,000 Daltons with a N-hydroxysuccinimidyl ester functional group.

PEG based hydrogels have found broad use in medical products. As a result, they are widely accepted and PEG-monomers with a range of functionality are commercially available in medical grade. Polyoxazolines have gained attention as a potentially desirable alternative to PEG-based products. Poly(2-oxazoline)s have the structure —$(CH_2CH_2N(COR))$—, where the R group can be H, an alkyl group or other functionality. Amine terminated poly (2-ethyl-2-oxazoline) is available from Sigma-Aldrich. Terminally functional monomers do not allow for crosslinking, but a polyfunctionalized electrophilic monomer with three or more functional groups can effectuate crosslinking. Poly (2-R-2-oxazoline)s with 25% side chains populated with N-hydroxylsuccinimiide (NHS)-ethyl groups were synthesized as described in published U.S. patent application 2019/0125922 to Bender et al., entitled "Tissue-Adhesive Porous Hemostatic Product," incorporated herein by reference.

It has been determined that hydrogels formed with macromers with longer distances between crosslinks are generally softer, more compliant, and more elastic. Thus, in the polymers of the '566 patent, increased length of the water-soluble segment, such as polyethylene glycol, tends to enhance elasticity. Molecular weights of hydrophilic macromers as used herein, such as macromers with polyethylene glycol macromer cores, generally are at least about 2,000 Da, in some embodiments from about 2500 Da to about 500,000 Da, in other embodiments from about 5,000 Da to about 250,000 Da, in further embodiments from about 7500 Da to about 100,000 Da, in additional embodiments from about 10,000 Da to about 50,000 Da, and in other embodiments in the range of about 15,000 Da to about 40,000 Da. PEG precursors in the lower portions of these weight ranges may be liquids. As used herein, molecular weights (mass) are in conventional units, which can be equivalently Daltons or as a molar mass-grams/mole (assuming natural isotopic presence in either case), and for polymers molecular weights are generally reported as averages if there is any distribution of molecular weights. A person of ordinary skill in the art will recognize that additional ranges within the explicit ranges above are contemplated and are in the present disclosure.

The hydrogel precursors in the hydrogel precursor solutions have a ratio of electrophilic functional groups and amine functional groups. The ratio of functional groups can alter the crosslinking density and the nature of the resulting hydrogel. Generally, if the number ratio of electrophilic functional groups to amines is one to one, the hydrogel can fully crosslink given sufficient time and lack of constraints. In some embodiments, the ratio of nucleophilic functional groups to electrophilic functional groups is not less than 1. Generally, the ratio of electrophilic functional groups to nucleophilic functional groups can be from about 0.8 to 1.2, and in further embodiments from about 0.9 to about 1.1, in further embodiments from about 0.95 to about 1.05, in other embodiments from about 0.98 to about 1.02, in additional embodiments from about 0.99 to about 1.01 and in some embodiments from about 0.995 to about 1.005, although the ratio can be approximately 1:1. Person of ordinary skill in the art will recognize that additional ranges of ratios within the explicit ranges above are contemplated and are within the present disclosure.

To achieve the desired ratios of functional groups, the functional groups can be distributed in various ways. Pendent functional groups extending from a core can be referred to as being associated with an arm of the precursor. A precursor generally has 2, 3, 4, 5, 6, 7, 8, 9, 10 or more arms. At least one precursor generally has at least 3 arms to obtain crosslinking, and 4, 6 or 8 armed precursors can be convenient for obtaining desirable hydrogel properties. To obtain a one-to-one ratio of functional groups, equal molar amounts of precursors can be used if they have the same number of arms, or if different numbers of arms are present on the respective precursors, the mole ratios can be correspondingly adjusted. Thus, twice the molar amount of a 4-arm precursor can be combined with an 8-arm precursor to obtain a 1:1 functional group ratio. For weight ratios, the mole ratios can be adjusted accordingly based on the relative weights, for an 8-arm 10K MW (10,000 molecular weight) precursor it would be combined with twice the mass of an 8-arm 20K MW precursor to get a 1:1 functional group ratio. A person of ordinary skill in the art can adjust these calculations to obtain a different number ratio for the functional groups.

Functional Groups and Crosslinking Reactions

The crosslinking reactions generally are designed to occur upon hydration with aqueous fluids that are essentially physiological fluids in vivo, surrounded by physiological conditions, although the medical procedure may involve some local dilution or modification of the physiological fluids, such as with disinfecting agents or other procedural expedient, from their pure natural state without changing the basic processing of the hydrogel precursors. To assist with hydration, the substrates can be wet before applying the patch to the tissue, as explained further below. Unless specifically stated otherwise, reference herein to physiological fluids can involve minor modifications of natural fluids due to the medical procedure. Thus, the crosslinking reactions occur "in situ", meaning they occur at local sites such as on an organ or tissues in a living animal or human body. Due to the in situ nature of the reaction, the crosslinking reactions can be designed not to release undesirable amounts of heat of polymerization. Gelation times for desirable procedures are described above, and full crosslinking can be completed generally after times from 2 minutes to 10 hours, although other times outside this range may be acceptable. For longer complete crosslinking times may begin to compete with degradation times.

Certain functional groups, such as alcohols or carboxylic acids, do not normally react with other functional groups, such as amines, under physiologically acceptable pH. However, such functional groups can be made more reactive by using an activating group such as N-hydroxysuccinimide or derivatives thereof. In general, several methods for activating such functional groups are known in the art. Suitable activating groups include, for example, carbonyldiimidazole, sulfonyl chloride, chlorocarbonates, aryl halides, sulfosuccinimidyl esters, N-hydroxysuccinimidyl ester (NHS), succinimidyl ester, succinimidyl amide, epoxide, aldehyde, maleimides, imidoesters and the like. The N-hydroxysuccinimide esters or N-hydroxysulfosuccinimide groups are desirable groups for crosslinking of amine functionalized polymers such as amino terminated polyethylene glycol ("APEG") since they have found acceptance in medical implants from long periods of use in approved products. A further extensive discussion of general medical hydrogels is found in U.S. Pat. No. 7,332,566 to Pathak et al., entitled "Biocompatible Crosslinked Polymer With Visualization Agents," incorporated herein by reference.

Suitable nucleophilic functional groups are polymers with primary amines conjugated to an acid. Thus, the other functional group used for the crosslinking generally is an amine. Amines are weak bases. In some embodiments, the acid conjugate is HCl, and an HCl salted amine, such as a PEG amine, is formed. The acid conjugate can be chosen to match the approximate molarity of the amine. The advantage of an NHS-amine reaction is that the reaction kinetics lead to quick gelation usually within 10 about minutes, more usually within about 1 minute and most usually less than 30 seconds. Gelation times can be limited by hydration times for the dried hydrogel precursors. The protonated amines are generally not suitable for performing nucleophilic substitution. Thus, the precursor blend can be prepared at a suitable pH to maintain substantially protonated amines prior to delivery for contact with a physiological solution.

The crosslinking density of the resultant biocompatible crosslinked hydrogel is controlled by the overall molecular weight of the monomers and the number of functional groups available per molecule. A lower molecular weight between crosslinks such as 2000 Da will give a higher crosslinking density as compared to a higher molecular weight such as 100,000 Da. Higher molecular weight monomers can be used to obtain more elastic hydrogels, and correspondingly lower molecular weight monomers can be used to obtain less elastic hydrogels. Different applications may suggest different properties for the hydrogels.

Another method to control crosslink density is by adjusting the stoichiometry of nucleophilic functional groups to electrophilic functional groups. A one to one ratio can lead to the highest crosslink density. In general, over time, the hydrogel completes curing so that available crosslinking sites form crosslinking bonds. If the electrophilic and nucleophilic are provided in equal equivalent amounts it can be expected that approximately all functional groups form crosslinking bonds after full curing. Equal numbers (or reaction equivalents) of the two types agents generally provides the highest crosslinking density. If a different ratio of functional groups is used, the properties of the cured hydrogel can be accordingly somewhat different. The crosslinking density can depend on the number of functional groups on the precursor molecules as well as on the ratio of precursor molecules. A non-stoichiometric ratio of electrophilic and nucleophilic groups can be used to alter the crosslinking density if desired. The ratio of functional groups is described further above.

Degradable or Non-Degradable Linkages

Generally, it is desirable for the patches to be degradable, and in some embodiments relatively quickly degradable. Thus, if the patches are implanted, they do not persist indefinitely. For the patch to degrade, both the substrate and the in situ formed hydrogel degrade. Depending on the application, it may or may not be desirable for the hydrogel to be degradable, such as through hydrolysis or biodegradation due to enzymatic activity, although for hemostatic patches, the patches generally are designed to degrade quickly so they do not persist long after stable clotting. If it is desired that the biocompatible crosslinked hydrogel polymer be degradable or absorbable, one or more precursors having degradable linkages present in between the functional groups may be used. As used in the art, absorbable polymers can be referred to as biodegradable if they are absorbed under physiological conditions, whether or not they degrade by biological action, such as enzymatic cleavage. The degradable linkage optionally also may serve as part of the water soluble core of one or more of the precursors. In the alternative, or in addition, the functional groups of the precursors may be chosen such that the product of the reaction between them results in a degradable linkage. For each approach, degradable linkages may be chosen such that the resulting degradable biocompatible crosslinked hydrogel polymer degrades or is absorbed in a desired period-of-time range. In other embodiments, functional groups and linkages with functional groups can be selected to resist degradation under physiological conditions to substantially reduce or eliminate absorption of the patch.

Generally, degradable linkages are selected that degrade the hydrogels under physiological conditions into non-toxic products for removal from the patient by natural pathways. Illustrative enzymatically hydrolyzable biodegradable linkages include peptidic linkages cleavable by metalloproteinases or collagenases. Additional illustrative biodegradable linkages can be functional groups on the core polymers and copolymers, such as hydroxy-carboxylic acids, orthocarbonates, anhydrides, lactones, (aminoacids, carbonates, phosphonates or combinations thereof. In exemplified embodiments, the degradable linkages are esters formed by hydroxy-carboxylic acid moieties adjacent the electrophilic group used for crosslinking. Esters can degrade gradually by hydrolysis under physiological conditions, with persistence time depending on the specific structure. To have non-degradable hydrogels, the esters formed by hydroxy-carboxylic acid moieties can be replaced by amide groups that generally do not hydrolyze under physiological conditions. Monomers with PEG cores are commercially available with N-hydroxysuccinimide electrophilic groups attached with amide linkages or alternatively with ester linkages, for example, from Jenkem Technology, TX, U.S.A. PEG-amines are also available from Jenkem with various numbers of arms and molecular weights. Desirable degradable electrophilic groups include, for example, N-hydroxy succinimidyl succinate (SS), N-hydroxy sulfosuccinimidyl succinate, N-hydroxy sulfosuccinimidyl gluterate, succinimidyl glutarate (SG), succinimidyl adipate (SAP), succinimidyl azelate (SAZ), or a mixture thereof. Examples are described below of rapidly degrading patches with the SS linker. Mixtures of degradable linkages and non-degradable linkages, such as the amides described above, can be used to adjust the persistence time, such as to form oligomeric species for clearing by the body.

Hydrogel and Patch Properties

Evaluation of patch properties can be performed in vitro under specified conditions so that the properties are independent of the biological conditions. Such evaluations are helpful to describe the patch characteristics, which are significant for actual use in vivo. In this context, we describe measurements of gel times, swelling, substrate porosity, burst strength and persistence times, and corresponding measurements are presented in the examples. However, for the evaluation of patch performance in actual procedures, protocols can be used to provide appropriate limits of patch behavior under in test conditions that mimic bleeding tissue to provide a reproducible context for patch evaluation. Examples below present results for the in vitro testing with comparisons in actual use for animal models. For the dry patches, the density of the patch (substrate and precursor layers) can be from about 0.075 g/cm$^3$ to about 0.5 g/cm$^3$. For the precursor layer alone, the density can be from about 0.050 g/cm$^3$ to about 0.450 g/cm$^3$. A person of ordinary skill in the art will recognize that additional ranges of density within the explicit ranges above are contemplated and are within the present disclosure.

The gel time for a sample patch can be evaluated in a laboratory setting which provides an appropriate estimate for the in vivo performance. The Examples provide measurements made on specific samples. Gel times are evaluated with a commercial texture analyzer. Texture analyzers are available from Texture Technologies Corp./Stable Microsystems, Ltd. (such as model TA-XT Plus) and Brookfield Technologies (such as model CTX texture Analyzer). These systems are designed to analyze foods and soft medical materials. The instrument is first calibrated with a standard test block following a standard procedure for the instrument. A TA-005 probe (Texture Technologies) having a ¼ inch diameter and a flat surface (alternatively a hemispherical shape) can be used with a 5 kg load cell. The sample holder is heated to 37° C. to track standard body temperature. The sample holder is a non-porous polymer foam block with a 1.5 mm hole cut in the middle. An 8 mm diameter punch sample from the patch is placed centered over the hole in the sample holder placed precursor layer down. To initiate the test run, the tester is started, and 67 microliters (μl) of 37° C. buffer solution (pH 8.0) is added for an 8 mm punch sample to the center of the test sample. The texture analyzer can be programmed accordingly to meet these parameters. The force needed to deform the patch by 0.4 mm is determined as a function of time.

The plot as a function of time results in a characteristic curve. The patch starts in a dehydrated state that is stiff, so the force is initially relatively high. Over the course of several seconds, the patch will hydrate and the force reaches a minimum. Crosslinking can be expected to initiate and undergo early processing during the hydration. As crosslinking continues, the force begins to increase indicating that crosslinking has reached a point of firming up the material. The time at which the force begins to increase is considered the gel time, which marks the point of gelation where the gel begins to firm. In these systems, the use of the patch involves hydration during which the solid precursors hydrate and start crosslinking. Thus the dissolving of the precursors is counteracted by the crosslinking. As the hydration initiates, the solid softens until the crosslinking progresses sufficiently starts firming up the hydrogel. The gelation process has a different character from solution based hydrogel system that start with dissolved precursors. The force continues to increase as the crosslinking continues after the start of gelation. The measurements are taken in triplicate for three equivalent punches from the same patch, and the results are averaged. For the patches described herein, the gel times generally are no more than about 5 minutes, in further embodiments from about 3 seconds to about 3 minutes, in some embodiments from about 4 seconds to about 2 minutes, and in additional embodiments from about 5 seconds to about 1 minute. A person of ordinary skill in the art will recognize that additional ranges of gel times within the explicit ranges above are contemplated and are within the present disclosure.

Patch samples can also be tested for burst pressure, and these values are desirable for ensuring the samples have desired performance in actual use. Burst pressure measurements are designed to provide standard test conditions relating to the patch adhering to tissue that is bleeding. As described after the burst testing explanation, the same samples can then be used to evaluate swelling. Burst testing can be evaluated on an apparatus designed to simulate bleeding tissue adapted for measurements according to ASTM F2392-04 (2015). The ASTM protocol provides information relating to the surface of the test fixture, which is then adapted for use with the porous plates of the test apparatus. It is believed that no commercial version of such testing equipment is available, but corresponding testing would be highly desirable for testing patches for clinical use. Thus, a comparable test apparatus was constructed with regulatory influence in design in view of and consistent with the noted ASTM protocol noted above, as described further in the Examples below.

For the testing, a calibrated syringe pump was used with a 60 ml syringe tube filed with saline and a setting on the pump of 2 ml/min. A burst fixture is used with a cavity connected to the syringe pump, in which the cavity has a circular opening at the top. A pressure sensor, such as a digital manometer, is hooked up also the cavity such that pressure in the cavity is measured. To start the test, the cavity is filed using the syringe pump until the cavity is almost full. A test block with a patch sample from the gel testing is placed over the hole on the top of the fixture with the patch punch sample facing upward. Similarly, a hydrated patch pressed to the test block could be similarly used, but using the patch after the gel test provides a uniformly prepared patch for burst testing. In this configuration, the hole in the sample holder is centered over the burst fixture cavity. A top half of the fixture is then tightened over the test block to secure the sample holder with a hole associated with a cavity extending through the top half of the fixture exposing the sample from the top. The measured pressure on the manometer is expected to increase once the top fixture secures the test block.

With the fixture secured with the top portion in place, the pump is started to pump water into the cavity to continue increasing the pressure in the cavity. The pump is operated until 1) liquid appears on the surface of the patch sample, 2) a popping sound is heard, or 3) the maximum pressure registered on the manometer does not change for 30 seconds. Once a condition has been reached, the pump is stopped and the maximum pressure value obtained is recorded as the burst pressure, which is recorded in millimeters of mercury (mmHg). For patch samples as described herein, the burst pressure can be at least about 10 mmHg, in further embodiments at least about 15 mmHg, in further embodiments at least about 50 mm Hg, and in other embodiments from about 20 mmHg to about 1500 mmHg. A person of ordinary skill in the art will recognize that additional ranges of burst pressure within the explicit ranges above are contemplated and are within the present disclosure.

Upon hydration, both the substrate and the precursor layer swell. While swelling can, in principle, be evaluated several reasonable ways, herein swelling is evaluated by the weight due to water retention. The dry weight of the patches before testing can be an initial reference point. Ultimately, swelling can be evaluated based on incubation with aqueous fluid, but over longer periods of time, the patch materials can degrade. Essentially, the swelling described herein is evaluated after about 24 hours incubation in 37° C. phosphate buffered saline. The samples for evaluation can be the same samples used for other property measurements, and this gives consistent estimates of swelling using the hydrated, non-immersed weights as a reference point. The samples at the end of the burst test can be used to further evaluate swelling. The samples can be carefully removed from the sample holder following the completion of the burst test. The samples are then weighed to get an initial weight. Then, a weighed sample is placed into a 50 ml tube with roughly 45 ml of phosphate buffered saline (PBS) and sealed. PBS is a standard buffer for medical and other biological applications and generally comprises sodium chloride, some potassium chloride and phosphates. PBS is available from standard suppliers (Fisher Scientific, Sigma-Aldrich, etc.) and is classified in PubChem (https://pubchem.ncbi.nlm.nih.gov/compound/Phosphate-Buffered-Saline). The sealed tubes are placed into a 37° C. water bath. After 24±2 hours, the tubes are removed from the water bath. Then, the incubated samples are removed, patted dry and weighed. The value of percent swelling is determined form the following equation:

% Swelling=100×(weight out−weight in)/weight in.

The value for "weight-in" can be a dry weight or a weight corresponding to an alternative reference point, such as the weight following a burst test. For the patches described herein, the swelling (from following the burst test to incubated in PBS for 22-26 hours) can be at least about 100%, in further embodiments form about 135% to about 350%, and in other embodiments from about 150% to about 300%. A person of ordinary skill in the art will recognize that additional ranges of swelling within the specific ranges above are contemplated and are within the present disclosure.

While the substrate has a high swelling weight, it is initially porous, so the volume swelling is muted. The hydrogel precursors are initially dense, so upon crosslinking and swelling the volume change generally is more significant for the crosslinking hydrogel. Thus, following hydration and swelling, the increase in volume of the hydrogel layer can be more significant than the substrate volume change.

Another significant characterization is the persistence of the patch. In vitro measurements can be made for consistent measurement to mimic the in vivo behavior. The persistence of the substrate and the associated crosslinked hydrogel layer can be different from each other. The persistence behavior of the substrate can be evaluated by continuing the swell test. Specifically, the samples loaded into the tubes with PBS can be kept in the 37° C. heat bath until the substrate of the patch sample is no longer visible. The time at which the substrate of the samples disappear is considered the end of the substrate persistence time. Generally, the substrate disappears in no more than 96 hours, in further embodiment no more than about 84, and in additional embodiments no more than about 72 hours. It can be desirable in some embodiments for the substrate to disappear in no more than about 48 hours. A person of ordinary skill in the art will recognize that additional ranges of degradation times within the explicit ranges are contemplated and are within the present disclosure. Generally, the hydrogel formed in situ persists longer than the substrate.

Visualization Agents

Where convenient, the biocompatible crosslinked hydrogel polymer may contain visualization agents to improve their visibility during medical procedures and provides quick confirmation of the patch orientation with respect to the surface to place against the wound. In principle, the substrate can have a visualization agent in addition to (same or different) or as an alternative to the hydrogel precursor layer. The examples have patches with a blue visualization agent only in the hydrogel precursor layer. As used herein, visualization agents can refer to optical visualization (with color), or visualization using an imaging modality, such as x-ray or ultrasound. Visualization agents are especially useful when used in minimally invasive surgery (MIS, e.g., laparoscopy) procedures, due to among other reasons, their improved visibility on a color monitor. It is sometimes useful to provide color by adding a colored visualization agent to the precursor melts prior to casting the hydrogel layer on the substrate.

Visualization agents (optical) may be selected from among any of the various non-toxic colored substances suitable for use in medical implantable medical devices, such as FD&C BLUE dyes 1, 2, 3 and 6, indocyanine green, or colored dyes normally found in synthetic surgical sutures. In some embodiments, green or blue colors are desirable because these have better visibility in presence of blood or on a pink or white tissue background. The dyes can be added in trace amounts as dehydrated compounds to the melt blend for forming the dry hydrogel layer.

The selected colored substance may or may not become chemically bound to the hydrogel. Additional visualization agents may be used, such as fluorescent (e.g., green or yellow fluorescent under visible light) compounds (e.g., fluorescein or eosin), x-ray contrast agents (e.g., iodinated compounds) for visibility under x-ray imaging equipment, ultrasonic contrast agents (e.g., microbubbles), or MRI contrast agents (e.g., Gadolinium containing compounds). Biocompatible visualization agents FD&C BLUE #1 and fluoroscein-NHS can be particularly desirable for some applications. Visualization agents may also be biologically active agents suspended or dissolved within the hydrogel matrix, or the materials used to encapsulate a biologically active agent, if present.

As noted above, visually observable visualization agents can be advantageously used for some embodiments. Wavelengths of light from about 400 to 750 nm are observable to the human as colors (R. K. Hobbie, Intermediate Physics for Medicine and Biology, $2^{nd}$ Ed., pages 371-373). Blue color is perceived when the eye receives light that is predominantly from about 450 to 500 nm in wavelength and green is perceived at about 500 to 570 nm (Id.). Further, since the eye detects red or green or blue, a combination of these colors may be used to simulate any other color merely by causing the eye to receive the proportion of red, green, and blue that is perceived as the desired color by the human eye. The color blue, as used herein, means the color that is perceived by a normal human eye stimulated by a wavelength of about 450 to 500 nm and the color green, as used herein, means the color that is perceived by a normal human eye stimulated by a wavelength of about 500 to 570 nm.

One or more visualization agents can be present in the final electrophilic-nucleophilic precursor layer at an appropriate concentration for visualization, such as about 0.0001 mg per square centimeter ($g/cm^2$) to about 0.5 $g/cm^2$, although greater concentrations may potentially be used, up to the limit of solubility of the visualization agent. In some applications, these concentration ranges were found to give a color to the hydrogel that was desirable without interfering with crosslinking times (as measured by the time for the reactive precursor species to gel). The visualization agent is generally not covalently linked to the hydrogel. A person of ordinary skill in the art will recognize that additional ranges of visualization agent concentrations within the explicit ranges above are contemplated and are within the present disclosure.

The visualization agent may serve to help visualize the interface of the patch with the underlying tissue. In some embodiments, the dye is conjugated to an electrophilic or nucleophilic end group to allow for incorporation into the patch for visualization with direct correlation to persistence. In some cases, the dye is fluorescent, allowing for visualization under special lighting conditions only and render the single system gel otherwise invisible under normal visual conditions.

The user may use visualization agents to see the hydrogel with the human eye or with the aid of an imaging device that detects visually observable visualization agents, e.g., a video camera. A visually observable visualization agent is an agent that has a color detectable by a human eye. A characteristic of providing imaging to an X-ray or MRI machine is not a characteristic sufficient to establish function as a visually observable visualization agent. An alternative embodiment is a visualization agent that may not normally be seem by the human eye but is detectable at a different wavelength, e.g., the infrared or ultraviolet, when used in combination with a suitable imaging device, e.g., a video camera. Similarly, an echolucent agent, such as air bubble, can provide improved imaging by ultrasound. Hydrogels with visualization agents for x-ray and/or ultrasound visualization are described further in U.S. Pat. No. 8,383,161 to Campbell et al., entitled "Radiopaque Covalently Crosslinked Hydrogel Particle Implants," incorporated herein by reference.

Radiopaque moieties can be introduced through radiopaque precursor molecules or covalently linked to the hydrogel functional groups. For example, triiodobenzoate can be bound to one of the arms of precursor at an ester group. The overall number of arms can be selected to achieve desired crosslinking and radio-opacity. A CT number (also referred to as a Hounsfield unit or number) is a measure of visibility under indirect imaging techniques. A CT number of at least about 50 may be used, and in some embodiments the CT number can be from about 70 to about 2000.

Methods for forming the Patch and Storage

The method for preparing the patch involves obtaining the substrate, applying the precursor layer, and packaging in a water-resistant package, as well as optional drying steps at one or more times through the process. If the substrate is not a commercial product, the method can further comprise preparing the substrate. For commercial production, the processing can produce sheets of patch material that can then be cut to size if appropriate. Sizes generally can involve a set of commercial sizes for selection as appropriate by a health care professional with due attention that patches can be cut to size if desired at the time of use, as noted above. Application of the precursor layer can involve delivery of a melt blend or the solution coating with a non-aqueous precursor solution, and the layer deposition can optionally involve forming sublayers. The water content can be reduced below a target amount for packaging, and processing is generally performed in a closed environment with low water vapor levels since the materials generally are hydroscopic. Packaged patches are labeled for use and dated to reflect an appropriate shelf life and appropriate distributed.

Substrates can either be purchased in a form to be used or can be processed from appropriate starting materials. Purchased materials can be procured according to product specifications, and desirable patch properties are described above, the substrates are correspondingly selected to meet these properties. Whether or not procured or further processed to prepare materials for patch formation, the substrates can be further dried before adding the precursor layer. Drying can be performed by various approaches, such as placement in a drying oven, contacting with dry gas, isolation with desiccant, combinations thereof, or the like. Suitable drying ovens can be selected based on the size of substrate material, and the heating can be continued until the relative humidity drops below a target value. Thermal treatments can be performed under suitably mild conditions so the properties of the material do not change in an undesirable way. Suitable desiccants are commercially available, such as zeolites, calcium chloride, calcium sulfate and the like.

In some embodiments, the precursor layer can be formed using a solvent coating approach. The solutions of the precursors should be non-aqueous to avoid introducing water that would need to be removed and to avoid deprotonation of the amines. The precursors should nevertheless be soluble in the solvents. Suitable solvents can include, for example, aromatic liquids, such as toluene, xylene, chlorobenzene, ethyl benzene, or the like, alkanes, such as hexane, or aprotic solvents, such as tetrahydrofuran, ethyl acetate, acetone, acetonitrile, dimethylsufoxide, blends of two or more of any of these liquids, or the like. In general, the concentration would be selected to be as high as compatible with process conditions, such as viscosity, such that a uniform coating can be applied with lesser amounts of solvent. A person of ordinary skill in the art can select the concentration based on the selected coating technique and solvent selected. The solutions can comprise a visualization agent and possibly other additives, such as biologics/therapeutic agents. Suitable coating techniques include, for example spray coating, jet printing, slot coating, screen printing, extrusion or the like. As is well known in the art, extrusion generally would suggest different ranges of viscosity and solid concentrations than spray coating.

Using a solvent-free process has the advantage of avoiding solvent use and associated waste cleanup. The flow temperatures of polyethylene glycol (PEG) based precursors are fairly low, generally below 100° C. and are relatively weakly molecular size dependent. Some low molecular weight PEG-based precursors can be liquids at room temperature, which can be blended with a precursor that is a solid at room temperature to form a solid blend. Polyoxazolenes generally have a moderately higher flow temperature, which can be from about 150° C. to 250° C. depending on the side chains and the molecular weights. Thus, blends of PEG based precursors can be formed at relatively low temperatures and appropriately coated onto the substrate using any reasonable technique. The precursor layer can comprise a visualization agent and possibly other additives, such as biologics/therapeutics. While other coating techniques can be used for the melt deposition, slot-die coating can be a convenient technique since suitable commercial apparatuses can maintain the material at the appropriate temperature while setting an adjustable coating thickness. The apparatus can be selected to match a desired substrate size, and the substrate can be conveniently supplied as a sheet or roll of material. Suitable commercial slot coating apparatuses include, for example, FOM Technologies (Denmark), Yasui Seiki (Miriwek Film, Ink, IN, USA), and Coating Tech Slot Dies, Corp. (WI, USA).

Figure 2:
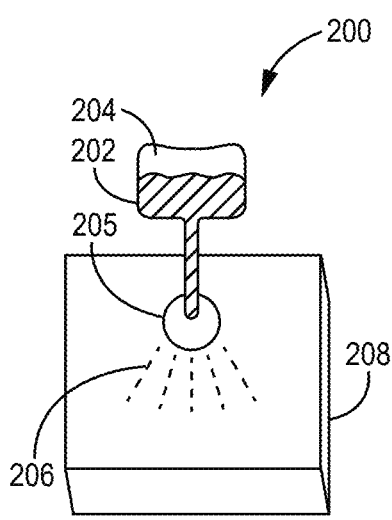
FIG. 2 is a perspective view of an apparatus for spray coating of a blended precursor composition onto a substrate to make a hemostatic patch.
Figure 3:
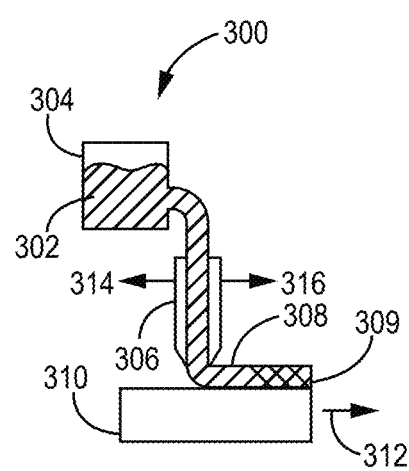
FIG. 3 is a side-view of an apparatus for slot-die coating of a blended precursor composition onto a substrate to make a hemostatic patch.
Figure 4:
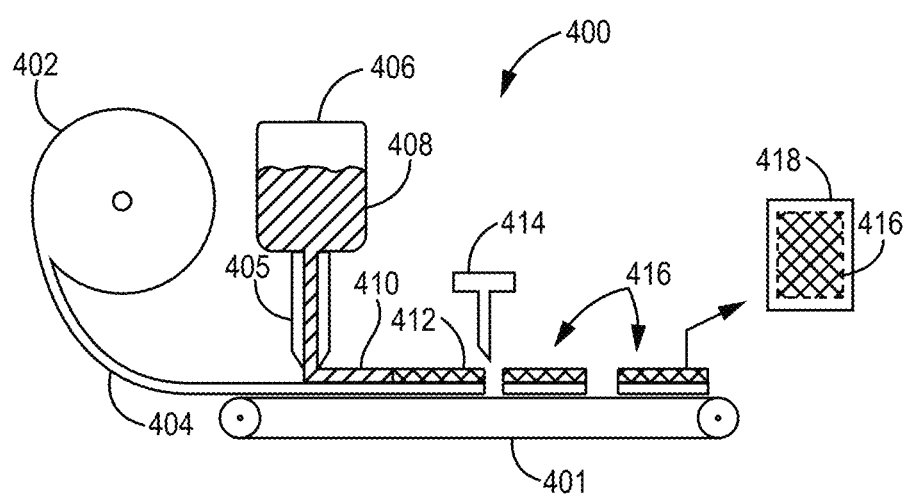
FIG. 4 is a side-view of an apparatus for continuous roll slot-die coating of a blended precursor composition onto a substrate to make a hemostatic patch.

FIGS. 2-4 illustrate various apparatuses for forming sealant patch 100, which can be used as a hemostatic patch. Referring to FIG. 2, spray coating apparatus 200 has blended precursors 202, which can be a melt blend or an organic solvent blend, in vessel 204. Precursor blend 202 may be a neat mixture of melted precursors. Alternatively, precursor blend 202 may be a melt blend having one or more additional components to lower the viscosity. Additional components may include, for example, solvents such as anhydrous organic solvents. Vessel 204 may be capable of mixing and/or heating precursor blend 202 prior to delivery through spray nozzle 205. Precursor blend spray 206 is deposited onto substrate 208 to form a sealant patch composition having a coating of mixed, unreacted precursors on substrate 208. In some embodiments, the formed sealant patch composition is dried to remove solvent and/or residual water. In some embodiments, the formed sealant patch composition is cut into individual patches and stored in a moisture-controlled packaging or container.

Referring to FIG. 3, slot-die coating apparatus 300 has melt blend 302 in vessel 304. Melt blend 302 may be a neat mixture of precursors. Alternatively, melt blend 302 may have one or more additional components to modify the viscosity, such as organic solvents. Vessel 304 may be capable of mixing and/or heating melt blend 302 prior to delivery of melt blend 302 through slot-die 306 to form film 308 on substrate 310. Apparatus 300 may use additional equipment, such as filters, pumps, pulsation dampeners, degasification units, and/or flow regulators between vessel 304 and slot die 306. In general, film 308 is a continuous liquid film. Suitable slot coaters are commercially available, and use of one commercial slot coater is described in the Examples. Slot-die 306 can have various head sizes, viscosity ratings and stripe pattern options. The width of film 308 can be selected based on the choice of slot-die 306. The width of the film and slot dye can be selected to match the width of the desired product, or it can be wider than the width and cut to size after coating, such as a width that is a multiple of the product width and cut to form a plurality of products for each length of coated substrate. Slot-die 306 may be used to control the rate of deposition of melt blend 302 onto substrate 310, which correlates with the thickness of the precursor on the substrate. To perform the coating deposition with the slot die, the die and substrate are moved relative to each other, which can involve the substrate moving, the slot coater and die moving, or both moving. Apparatus 300 can be similarly used to coat a solvent blend.

In some embodiments, substrate 310 is moved as shown by directional arrow 312 during deposition of melt blend 302, and slot-die 306 can be held in place. Rate of substrate translation along directional arrow 312 and parameters of slot-die 306 can be adjusted to alter the thickness of film 308. If multiple layers are desired, the substrate can be translated back in the opposite direction to form a second layer, or translated back without coating and translated forward along directional arrow 312 to further apply the subsequent coating layer. The substrate can be supplied as individual units that are coated and subsequently cooled and/or dried for packaging. In other embodiments, the substrate can be provided as a larger sheet that is cut to size after coating, and the larger sheet may or may not be provided on a roll. Dry gelatin substrates are generally provided as a sheet that is relatively stiff.

In other embodiments, substrate 310 does not move but rather slot-die 306 moves along directional arrow 314 during deposition of melt blend 302. In further embodiments, substrate 310 does not move and slot-die 306 moves along the direction noted by directional arrow 314 for a period of time or until a selected travel distance is reached and then moves at the reverse direction indicated by directional arrow 316 for a period of time or until a selected travel distance is reached. Film 308 may be formed from a single deposition layer of melt blend 302 or multiple deposition layers of melt blend 302. In some embodiments, film 308 is formed by alternately depositing melt blend 302 while moving slot-die head 306 along directional arrow 314 to form a first deposition layer and then depositing melt blend 302 while moving slot-die head 306 along directional arrow 316 to form an additional deposition layer over the first deposition layer. The alternate deposition may be repeated for a selected number of times to achieve a desired thickness of film 308.

In some embodiments, film 308 cools to form coating 309 as a solid on the substrate. For many applications, coating 309 can be a continuous, solid-phase, single layer coating. In some embodiments, film 308 and/or coating 309 is dried to remove solvent and/or residual water. Apparatus 300 can be used in the formation of a hydrogel precursor patch composition comprising coating 309 on substrate 310. In some embodiments, the formed structure with hydrogel precursor patch composition on the substrate is cut into individual patches and stored in moisture-controlled packaging.

FIG. 4 is an embodiment of the roll slot-die coating apparatus 400 having substrate roll 402 from which substrate 404 is moved under slot-die 405 by belt 401 which moves at a selected rate. Belt 401 can be any convenient conveyor system, and can be replaced with a series of rollers or the like. Vessel 406 holds precursor blend 408, which can be a melt blend or an inert organic solvent solution. Precursor blend 408 may be a neat mixture of precursors. Alternatively, precursor blend 408 may have one or more additional components to modify the viscosity, such as solvents. Vessel 406 may be capable of mixing and/or heating precursor blend 408 prior to delivery of precursor blend 408 through slot-die 405 to form film 410 on substrate 404. Coating apparatus 400 may use additional equipment, such as filters, pumps, pulsation dampeners, degasification units, and flow regulators between vessel 406 and slot die 405. In some embodiments, film 410 can be a continuous liquid film, as deposited. Slot-die 405 can have various head sizes and viscosity ratings and stripe pattern options. The width of film 410 can be varied by the choice of slot-die 405. In some embodiments, film 410 has a width from 1 cm to 10 cm. Slot-die 405 may be used to control the rate of deposition of melt blend 408 onto substrate 404 which affects the thickness of film 410. The rate of translation of belt 401 can also be adjusted to affect the thickness of film 410. Film 410 may formed from a single deposition layer of melt blend 408 or multiple deposition layers of melt blend 408.

In some embodiments, film 410 cools to form coating 412. In general, coating 412 is a continuous solid coating, although portions of the substrate can remain uncoated if desired. Film 410 and/or coating 412 can be dried to remove solvent and/or residual water. Coating apparatus 400 forms a hydrogel precursor patch sheet comprising coating 412 on substrate 404. In some embodiments, cutting unit 414 is used to cut the hemostatic patch sheet into patch 416. Patch 416 can then be placed into water resistant package 418.

Processing can take place in a controlled atmosphere, such as under dried nitrogen, other inert gas or the like. After forming the patch, it can be packaged under dry inert gas into a moisture resistant package, such as a polymer and/or foil pouch, or the like. The patch can be heated. such as from 40° C. to 90° C., to induce further drying. The package can comprise a packet if desiccant inside to help maintain dryness. The Patch can be sterilized, for example using radiation after packaging. Sterilization can be under conditions that do not induce significant amounts of crosslinking. The packaging is appropriately labeled under regulatory guidelines for medical use and marked with an expiration date.

Storage of the patch is generally performed in the moisture resistant packaging. In some embodiments, the patches are heat sealed into a foil pouch. To increase storage time, it can be desirable to store the patch under refrigerated conditions. In general, the patches can be stored at temperatures of no more than about 5° C., or at standard refrigerator temperatures, which perhaps range from 1° C. to 7° C., although lower temperatures can be used as desired. For shorter term storage, the patches can be stored at room temperature. At refrigerated temperatures, the patches can be stored for at least 2 months, in further embodiments at least one year, in additional embodiments from three months to 3 years, and in some embodiments form 6 months to 2.5 years. A person of ordinary skill in the art will recognize that additional ranges of storage temperatures and times within the explicit ranges above are contemplated and are within the present disclosure. Patches that have exceeded their shelf life can be identified by lack of sufficient adhesion due to premature crosslinking or due to premature hydrolysis that removed the electrophilic groups for crosslinking.

Biologics and Drugs

The patches can comprise a biologic in addition to an optional visualization agent. Optional biologics or drugs can be, for example, an agent to promote blood clotting and/or healing. Thrombin can be added to the patch, although good hemostatic function has been obtained without complications of adding a blood product into the patch composition. With rapidly resorbing patch materials, the patch can degrade prior to any significant concerns regarding adhesion formation or microbial contamination. However, antimicrobial agents can be added if desired. In further embodiments, a therapeutic agent can comprise an analgesic, an anesthetic, a steroid, an antibiotic, a steroid, an anti-infective, an anti-inflammatory drug, a non-steroidal anti-inflammatory drug, an anti-proliferative, or combinations thereof. These modalities can be used effectively for local drug delivery by virtue of the patch providing local adherence as well as a depot for the added drug or biologically active agent.

Use and Medical Indications for the Patches

The medical patches described herein are particularly helpful for use as hemostatic patches. Hemostatic patches are applied with compressive force over a site with minimal, mild or moderate bleeding with the objective of stopping the bleeding. The patches may or may not include therapeutics, such as compounds to promote clotting, and the examples demonstrate effective hemostasis without any bioactive agents. The patches can be used more generally in contact with exposed tissue without necessarily attending to control of significant bleeding, such as for surgical closure applications. Activation of crosslinking of the patch is induced in contact with any biological fluid. With appropriate substrates and thicknesses, the patches can be relatively flexible and conformable even when dry, and this feature can be exploited for certain applications.

Generally, the patches can be delivered directly onto a wound site, such as in an open surgical procedure. In alternative embodiments, patches can be used in laparoscopic procedures since the patches are flexible sufficiently for delivery through a trocar. While the patches can be conveniently applied over a wound with the hydrogel precursor layer facing toward the wound, alternatively, the patch can be folded, for example with the hydrogel precursor side outward, and inserted into the wound such that the patch fills the wound. The hemostatic patch can also be ground up or shredded as desired to use as a filler either separately or in conjunction with another patch or a portion of a patch. The shredded patch formulation or analogous granular compositions described above can be dispensed via a cannula attached to a bellows type device. Such a formulation can be useful for sealing or controlling bleeding from broad oozing surfaces of tissues.

In some embodiments, the patch can be moistened with sterile aqueous solution, such as saline or water-for-injection shortly prior to application to the tissue, to initiate hydration. Generally, the patch is applied to a tissue with a sterile gauze pad or the like over the surface of the patch to facilitate the application process, and as used herein a gauze pad refers to a pad of any non-adhesive absorbent material. Roughly even pressure can be applied to the patch using the gauze pad for a period of time to allow adherence. The selected time is generally at least about 5 seconds, in further embodiments at least about 8 seconds, in some embodiments from about 10 seconds to about 4 minutes, and in other embodiments from about 12 seconds to about 2 minutes. A person of ordinary skill in the art will recognize that additional ranges of time within the explicit ranges above are contemplated and are within the present disclosure. The placement of the patch can comprise the use of a single patch or placement of a plurality of medical patches on the bleeding defect. Additional medical patches can be overlapping at least a portion of a first medical patches.

With respect to wounds, bleeding can be stopped through the use of the patch in a process referred to as hemostasis. Hemostasis involves coagulation such that bleeding stops, and it can be considered the first stage of wound healing. Following hemostasis, no more blood is exiting the wound. Using the patches described herein, generally hemostasis can be achieved within about 5 minutes and in some embodiments in no longer than 3 minutes. A person of ordinary skill in the art will recognize that additional ranges of hemostasis time within the explicit ranges above are contemplated and are within the present disclosure.

Specific uses of interest include applying the patch to a wound on or into an organ, or on a blood vessel. Broadly, hemostasis can involve any wound repair, although the degree of bleeding can vary significantly. The patches described herein can be used in the context of any degree of bleeding, but as demonstrated in the examples, they can be effective with heavy bleeding. In the context of surgical procedures, the patches can be used for placement in procedures involving blood vessels, the liver, intestines, uterus, pancreas, other organs, orthopedic applications, such as bones and connective tissues, or generally any surgical wounds, as well as wounds occurring from injuries. In some embodiments, the patch can be placed along skin for closure of a wound at the surface of the patient or for closing a surgical intervention.

While generally any tissue wound can be effectively covered with the patches described herein, the patches can be particularly effective for covering wounds in organs, which are prone to significant bleeding. Suitable organs include, for example, a bone, a gland, a digestive organ, a pulmonary organ, a urinary organ, a reproductive organ, a vessel, an interface with a natural or synthetic graft, or a combination thereof. In some embodiments, the organ is an artery or a vein, and the organ generally can be natural, grafted, or a combination thereof. In particular, the patch can be applied to a bleeding defect. The bleeding defect can be, for example, a suture line, a puncture wound, a bullet wound, a cavity, a gouge, a biopsy punch hole, a graft interface, or a combination thereof. The placement of the patch or patches can comprise placing the one or more medical patches on the bleeding defect in a non-flat geometry, which is often dictated by the shape of the organ. The placement of the patch can comprise wrapping the one or more medical patches around the organ. The extent of bleeding from an organ can be evaluated based on a Spot Grade bleeding score or other validated bleeding scale.

In some embodiments, the patch itself can be wrapped in a "pre-loaded" form allowing for deployment from a tubular applicator using a mandrel or plunger like mechanism to express the patch near the treatment site. Preloading of the patch serves for laproscopic applications where insertion through narrow tubular entryways is involved, and the patch can be further moved to the site of hemostasis upon introduction through laproscopic manipulators, which can also apply pressure to hold the patch against the wound. In other embodiments, a preloaded configuration deposits a wrapped patch or a cylindrical shaped patch that can be delivered into defects such as bullet wounds or puncture wounds where hemostasis by a flat substrate geometry is less ideal. In more embodiments, a preformed patch-mandrel relationship may provide for a delivery for a geometry less ideal for hemostasis using a flat patch, in which the mandrel surface has a desired shape for conforming the patch to the wound.

Figure 12A:
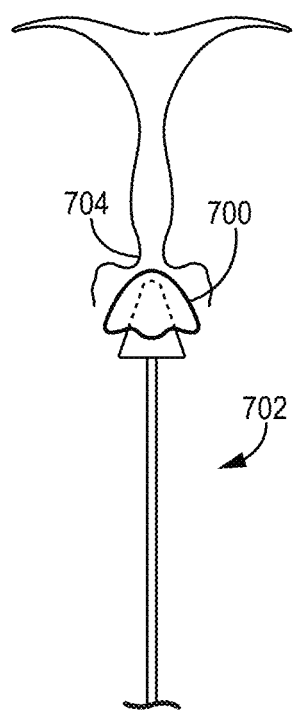
FIG. 12A is an illustration of a conical shaped hemostatic patch placed into the cervix using a cone shaped mandrel.
Figure 12B:
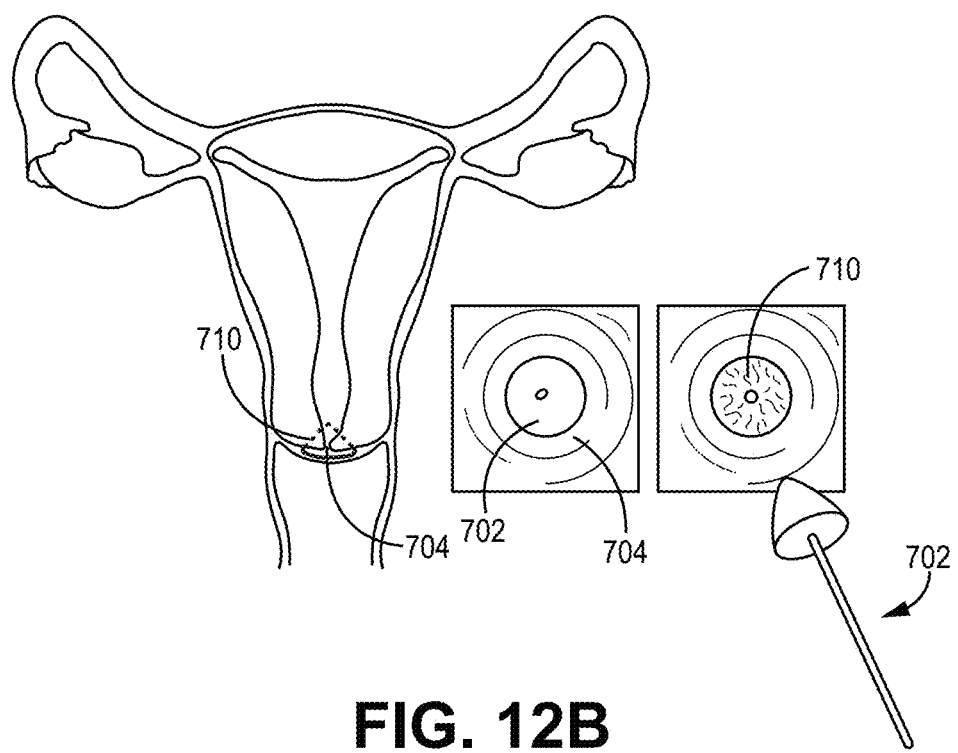
FIG. 12B is an illustration of the conical shaped hemostatic patch placed in the cervix, with the left inset illustrating the cone shaped mandrel pressing the patch into the cervix and the right inset illustrating the cone shaped mandrel having been removed and the cone shaped patch retained in the cervix. In the left inset, only the cone shaped end of the mandrel is depicted, with the handle of the cone shaped mandrel not shown.

One application envisioned is a conical preformed shape of a patch mated to a cone shaped mandrel for creating hemostasis following loop electrosurgical excision procedure (LEEP) of cervical tissue. In this circumstance the shape of the mandrel and pre-shaped patch act to fill the irregular conical depression left from the LEEP procedure, and the mandrel can be removed after the patch had adhered and reached hemostasis. FIGS. 12A and 12B illustrate one embodiment of the above application. FIG. 12A shows conical shaped hemostatic patch 700 placed into cervix 704 using cone shaped mandrel 702. FIG. 12B shows hemostatic patch 710 installed within cervix 704. The left inset shows cone shaped mandrel 702 providing pressure to the conical shaped hemostatic patch within cervix 704. The right inset shows that cone shaped mandrel 702 has been removed and installed hemostatic patch 710 has adhered to the irregular conical depression of the cervical tissue. For this and similar shaped embodiments, the patch can be heated to soften the precursor layer for shaping to a mandrel or just molded otherwise to a desired shape. If cooled on the mandrel, the shape can be essentially maintained for deployment.

In more embodiments, the patch is soft and conforming, through processing or pre-wetting, and can be applied for additional gynecological applications. Certain embodiments use a conformable patch for the cessation of bleeding on uterine resections following Cesarean section delivery. In additional applications, a softened patch can be applied transcervically for the stasis of post-partum hemorrhaging. Post-partum hemorrhage can be a significantly concerning condition resulting in rapid blood loss by the mother leading to lowered blood pressure and shock, potentially followed by death. In some circumstances, following failed therapeutic treatment and manual compression to cease hemorrhaging, a softened patch able to be delivered transvaginal/transcervical and conform to irregular intrauterine surfaces, removes the need for more extreme outcomes of surgical intervention, hysterectomy or death. Ideally, rapid hemostasis within 1-2 minutes by a patch would be followed by rapid resorption to reduce interference with any additional future medical diagnoses. Multiple patches may be employed until hemostasis is achieved.

While in some embodiments, the patch is wet shortly before delivery to the application site, the placing of a patch or patches can be performed without pre-wetting the one or more medical patches. In some embodiments, placement of one or more patches comprises wetting the one or more medical patches with unbuffered water or unbuffered saline prior to placing and/or after placing. Whether or not the patch is pre-wet, the patch hydrates relatively quickly. As the precursors crosslink to form the hydrogel, the precursor layer becomes adhesive. Generally, the precursor layer hydrates and adheres to the organ or other tissue in no more than about 2 minutes.

Ocular applications may involve patches with substrates that serve to prevent adhesion of the reacting precursors to the applicator or user during application to the wet ocular surface. In certain embodiments, the substrate rapidly dissolves, or is removable, such that it is present only long enough to prevent adherence during application. In other embodiments, the substrate is non resorbable, continues to provide structural support to the blended melt precursors, and is removed after application of the precursors. One can envision ocular applications of a premixed precursor melt containing therapeutics for the treatment of ocular surface conditions (such as to control post surgical pain) and/or treatments to the anterior chamber of the eye. In such embodiments, a releasable backing may be used to apply melted precursors plus therapeutic to the fornix of the eye, then removed following onset of crosslinking. In certain cases, melt blend of precursors may be less compatible to the substrate to reduce adhesion to the substrate during application. In other circumstances, the melt precursors are previously formed, cut to insert shape, and the substrate backing added afterwards or only prior to application. In cases where the substrate is added after creating of the unreacted blend, a binder such as a low Mw PEG liquid may be used to enhance the attachment of the melt blended precursors to said substrate during storage or just prior to application. One embodiment may include a melt precursor wafer attached to a disposable applicator substrate that can be patient administered to the fornix of the eye and then disposed.

From this embodiment, a variety of therapeutics may be delivered in sufficiently large quantities for potentially shorter periods of time under patient self administration. Larger therapeutic loading enables use of a wider variety of drug substances with lower potency. High potency candidates is a restriction for ocular implants constrained to small volume applications such as punctal plugs, anterior, posterior and suprachoroidal injections. One example would be the use of NSAIDs or bupivacaine for topical fornix delivery instead of highly potent corticosteroids that have potential off target issues such as increased intraocular pressure resulting from extended use. In these embodiments, the removal of the need for only highly potent therapeutics opens up ocular applications to the front of the eye such as treatment of pain inflammation, dry eye, infection and such.

In a surgical context, the patch generally provides desired burst strength, but suture can be also applied if desired, such as dissolving suture. For degradable patches, the applied patches can be sealed within the patient and left to safely degrade at an appropriate time for hemostatic stabilization. Generally, there is no need to intervene further with the patch, although in rare instances, supplemental attention can be applied to the wound. For in vivo use, the patches generally resorb through degradation into the body for removal, generally through the kidneys, completely within 28 days, in further embodiments within 21 days, and in additional embodiments from 7 days to 14 days. A person of ordinary skill in the art will recognize that additional ranges of time within the explicit ranges above are contemplated and are within the present disclosure. In alternative embodiments, the patch can be designed with the hydrogel being essentially non-resorbable such that it can persist for extended period of time.

Figure 5:
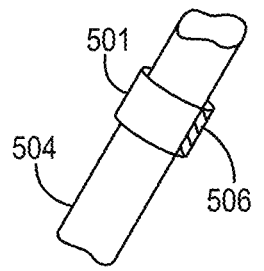
FIG. 5 is an illustration of a hemostatic patch wrapped around a tubular organ.

FIG. 5 is an illustration of hemostatic patch 501 wrapped around a tubular organ 504. In some embodiments, tubular organ 504 is an artery or a vein. Wrapped hemostatic patch 501 may have tail 506 formed by connecting the two ends of hemostatic patch 501. Hemostatic patch 501 may be dry prior to wrapping or pre-wetted. Examples 5 and 6 exemplify wrapping of a suture line on a femoral artery with hemostatic patch 501. Example 6 exemplifies the wrapping of hemostatic patch 501 using a bilayer of wetted gauze and hemostatic patch 501. As exemplified in Example 5, a hemostatic patch may be placed on a tubular organ and/or a tubular graft without wrapping. Example 6 exemplifies a non-wrapping process that uses disc-shaped hemostatic patches to establish hemostasis in cavity-type bone defects.

Figure 6:
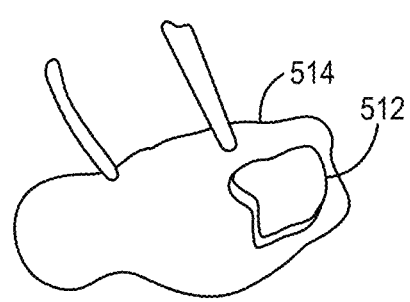
FIG. 6 is an illustration of a hemostatic patch placed on a non-tubular organ.
Figure 7:
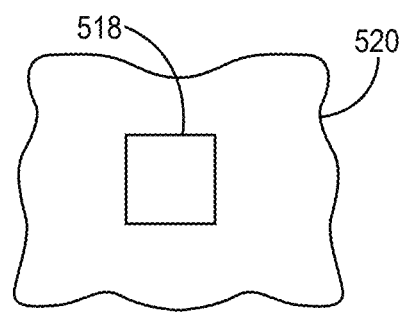
FIG. 7 is an illustration of a hemostatic patch placed on skin.

FIG. 6 is an illustration of hemostatic patch 512 placed on non-tubular organ 514. Examples 3 and 4 exemplify placement of hemostatic patch 512 on liver defects including concave and convex defect surfaces. FIG. 7 is an illustration of hemostatic patch 518 placed on skin 520.

Figure 8A:
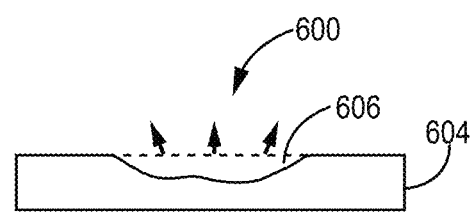
FIG. 8A is a cross-section view depiction of a bleeding defect of a tissue.
Figure 8B:
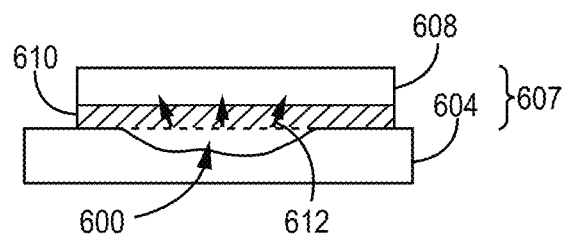
FIG. 8B is a cross-section view depiction of a hemostatic patch after placement on the bleeding defect of FIG. 8A.
Figure 8C:
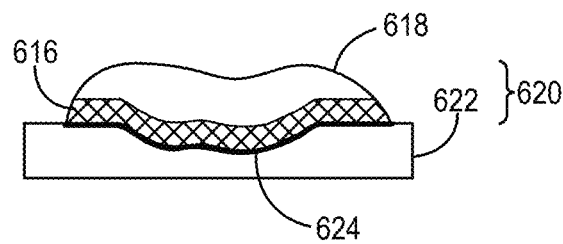
FIG. 8C is a cross-section view depiction of the hemostatic patch of FIG. 8B adhered to the bleeding defect.
Figure 8D:
FIG. 8D is a cross-section view depiction of the healed tissue after absorption of the hemostatic patch.

FIGS. 8A-8D illustrate the method of action of the hemostatic patch. FIG. 8A shows bleeding defect 600 of tissue 604 from which blood 606 is flowing. FIG. 8B shows hemostatic patch 607 placed on tissue 604. Hemostatic patch 607 is placed with substrate 608 facing away from bleeding defect 600 and melt blend layer 610 facing bleeding defect 600. Blood 612 from bleeding defect 600 wicks into hemostatic patch 607 allowing the precursors in melt blend layer 610 to dissolve and interact to form crosslinked hydrogel layer 616 (FIG. 8C). In some embodiments, melt blend layer 610 reacts to form crosslinked hydrogel layer 616 within 30 seconds after placement of hemostatic patch 607 on bleeding defect 600. FIG. 8C also shows that substrate 618 conforms to allow hemostatic patch 620 to adhere to tissue 622 and seal bleeding defect 600 to result in hemostatic defect 624. FIG. 8D shows healed tissue 626, with hemostatic patch 620 having been absorbed.

EXAMPLES

Example 1: Preparation of Hemostatic Patch Samples

This example describes the preparation of hemostatic patch samples.

Hemostatic patch samples were prepared by melt coating a dry blend of two hydrogel precursors onto a porcine gelatin substrate. Various gelatin/collagen substrates as shown in Table 1 were prepared. Each substrate was crosslinked, with light crosslinking referring to less than about 20% crosslinking and high crosslinking referring to more than about 20% crosslinking. Substrates A, B, and D were characterized by having small (micron-sized or smaller) pores and a porosity of greater than 80% as measured by mercury intrusion porosimetry. Each substrate was prepared for coating by drying in an oven under ambient air at a temperature of 35° C. for 18 hours or until the relative humidity of the oven was less than 5%. The thickness of the gelatin substrate after drying was approximately the same as the thickness before drying. For each patch sample, the first hydrogel precursor was an eight-armed polyethylene glycol-based precursor having a 15,000 Da molecular weight and succinimidyl glutarate (SG) functional end groups (8A15k PEG SG, Jenkemusa). The second hydrogel precursor was an eight-armed polyethylene glycol-based precursor having a 20,000 Da molecular weight and HCl-salted amine functional end groups (8A20k PEG amine-HCl, Jenkemusa). The first and second precursors were measured in powder form and then melt blended in a glove box with a trace amount of FD&C Blue #1 in a heated roller system at a temperature greater than 45° C. The melted precursor blend was delivered to a liquid dispensing system (Vulcan™ Jet Dispenser, Nordson). A single coating layer of the melt blend was applied to the dry gelatin substrate, in inert gas conditions, at a width of 0.5 mm per pass and a line speed of 50 mm/second until the overall width of the coating was approximately 20 cm. The thickness of the coating was approximately 0.25 mm. The mixed precursor-coated substrate was allowed to solidify at room temperature in inert gas conditions. The thickness of the resulting coated substrate was measured to be approximately 1.25 mm. The coated substrate was cut into individual hemostatic patches with dimensions of about 2×4 cm and packaged in a foil container or in single-use pouches, both designed to keep the starting relative humidity of the inert gas in the container below about 20 ppm. Commercial medical packaging that would be suitable include Amcor PerfecFlex 35772-E or Paxxus Symphony 26-1010. The patches were sterilized after packaging. The mixed precursor-coated side ("active face") of each patch was identified by its blue coloration, which was absent from the substrate backing on the opposite side of each patch.

TABLE 1

| Substrate Type | Characteristics | Substrate Thickness |
|---|---|---|
| A | Non-glossy (open cell), foamed gelatin/collagen with small pore size, low crosslinking | 1 mm |
| B | Two layers of Substrate A (non-glossy, foamed gelatin/collagen with small pore size, low crosslinking) | 2 mm |
| C | Unfoamed gelatin/collagen, low crosslinking | 1 mm |
| D | Non-glossy, foamed gelatin/collagen with small pore size, high crosslinking | 1 mm |

Example 2: In Vitro Testing of Hemostatic Patch Samples and Substrates

This example evaluated gel time, burst pressure, swelling, and persistence of a set of hemostatic patches prepared according to Example 1. This example also evaluated swelling and persistence of substrates.

Part A. Test Samples and Testing Procedures. Hemostatic test patches prepared according to Example 1 using substrate type A ("Test Patch A") were used in this study. Separately, (uncoated) samples of Substrate A and Substrate D, having low and high crosslinking, respectively, were also tested. Individual samples for testing were cut from a single piece of Test Patch A or a single piece of Substrate A or Substrate D. The test methods used in this example are described in the above "Hydrogel and Patch Properties" section.

Part B. Substrate Testing.

Samples of Substrate A were evaluated for swelling. Samples of Substrate A were weighed and then immersed in phosphate buffered saline (PBS) solution maintained at 37° C. for a selected period of time. Tables 2-4 show the swelling of the samples at 30 seconds, 1 minute, and 2 minutes, respectively. The swelling of the samples at 30 seconds, 1 minute, and 2 minutes was on average 814 wt %, 973 wt % and 1053 wt %, respectively. The results show that biocompatible substrates can be prepared to have a high rate of swelling and a high degree of swelling at 30 seconds.

TABLE 2

| Sample | Mass, g | Swelling at 30 seconds |
|---|---|---|
| 1 | 0.0065 | 835% |
| 2 | 0.0069 | 955% |
| 3 | 0.0068 | 954% |
| 4 | 0.0065 | 717% |
| 5 | 0.0065 | 837% |
| 6 | 0.0067 | 673% |
| 7 | 0.007 | 807% |
| 8 | 0.0071 | 728% |
| 9 | 0.0073 | 896% |
| 10 | 0.0069 | 735% |
| Average | 0.06237 | 814% |

TABLE 3

| Sample | Mass, g | Swelling at 1 minute |
|---|---|---|
| 1 | 0.0071 | 887% |
| 2 | 0.007 | 1017% |
| 3 | 0.0073 | 892% |
| 4 | 0.0073 | 1049% |
| 5 | 0.0066 | 1018% |
| Average | 0.07568 | 973% |

TABLE 4

| Sample | Mass, g | Swelling at 2 minutes |
|---|---|---|
| 1 | 0.0068 | 1103% |
| 2 | 0.0069 | 1077% |
| 3 | 0.0068 | 1000% |
| 4 | 0.0072 | 993% |
| 5 | 0.0074 | 1092% |
| Average | 0.08094 | 1053% |

Samples of Substrates A and D were evaluated for persistence in a PBS solution. The samples were immersed in a PBS solution maintained at 37° C. Samples were visually evaluated after 67 hours (2.8 days), 96 hours (4.0 days), and 114 hours (4.8 days). As shown in Table 5, each of the Substrate A samples (Samples 1-10) were observed to have partially persisted after 67 hours. Samples 1-10 were not visible at 96 hours, indicating that the persistence window for Substrate A was between about 2.8 and about 4 days. Each of the Substrate B samples (Samples 11-15) were observed to have persisted after 114 hours.

The results shows that substrate persistence in a simulated in vivo environment can be well-controlled via substrate processing. The results also show that biocompatible, absorbable substrates with high rates and overall amounts of water absorption have been prepared and that these high absorbance substrates can be designed to persist within a controlled window of time.

TABLE 5

| Sample | Substrate/ Crosslinking | Visible after 67 hours | Visible after 96 hours | Visible after 114 hours |
|---|---|---|---|---|
| 1 | A/Low | Partially | N | — |
| 2 | A/Low | Partially | N | — |
| 3 | A/Low | Partially | N | — |
| 4 | A/Low | Partially | N | — |
| 5 | A/Low | Partially | N | — |
| 6 | A/Low | Partially | N | — |
| 7 | A/Low | Partially | N | — |
| 8 | A/Low | Partially | N | — |
| 9 | A/Low | Partially | N | — |
| 10 | A/Low | Partially | N | — |
| 11 | B/High | Y | Y | Y |
| 12 | B/High | Y | Y | Y |
| 13 | B/High | Y | Y | Y |
| 14 | B/High | Y | Y | Y |
| 15 | B/High | Y | Y | Y |

Part C. Patch Testing.

Patch samples were cut from a single 2×4 cm piece of Test Patch A into 8 mm discs using an 8 mm biopsy punch.

Figure 11:
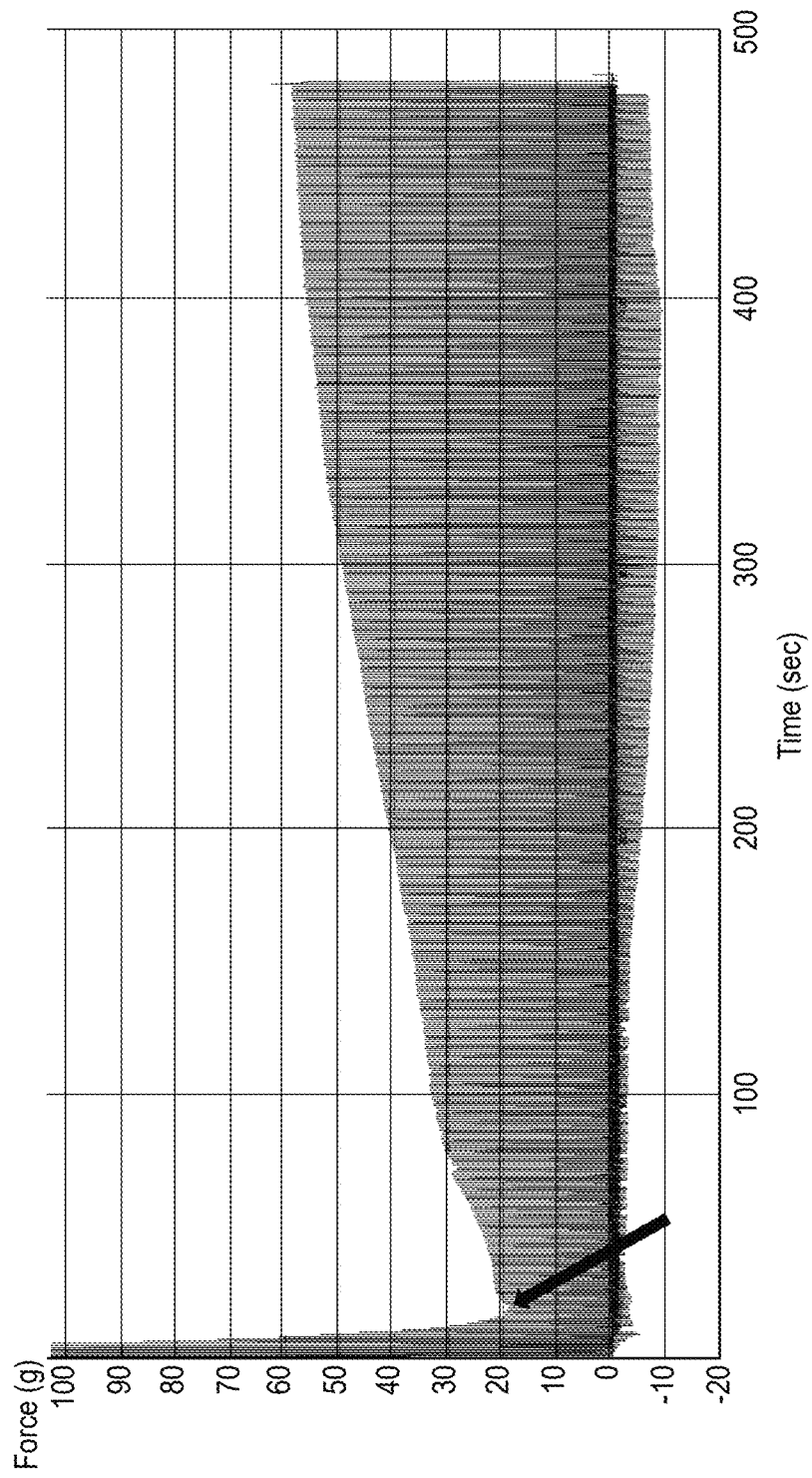
FIG. 11 is a plot of force versus time for a representative patch sample evaluated with a commercial texture analyzer.

Gel times of patch samples were evaluated with a commercial texture analyzer as described in the above "Hydrogel and Patch Properties" section. FIG. 11 shows a typical force versus time plot for a patch sample evaluated immediately after activation with a pH 8 buffer solution. The arrow in FIG. 11 indicates the time that corresponds with the lowest force on the plot. The gel time for this sample was measured to be 25 seconds.

After gel time testing, patch samples were tested for burst pressure. Table 6 shows burst pressure results. Sample 1 was recorded as having a burst pressure of 0 which indicates that the sample was not adhered to the test block after gel testing. Samples 2-5 had burst pressures from 10 mm Hg to 65 mm Hg. Samples 6-10 had burst pressures greater than 140 mm Hg, with sample 9 having a burst pressure of 188.2 mm Hg. Table 6 also shows the mass of the patch samples prior to burst testing and after burst. The swelling of the patch samples during burst testing ranged from about 340% to about 510%.

TABLE 6

| Sample | Mass, g | Burst Pressure, mm Hg | Mass after Burst, g | Swelling during Burst Testing |
|---|---|---|---|---|
| 1 | 0.0164 | 0 | 0.1004 | 512% |
| 2 | 0.0167 | 12 | 0.0847 | 407% |
| 3 | 0.0166 | 48 | 0.0988 | 495% |
| 4 | 0.0169 | 25 | 0.0779 | 361% |
| 5 | 0.0166 | 64.4 | 0.0921 | 455% |
| 6 | 0.0173 | 147.4 | 0.0801 | 363% |
| 7 | 0.0169 | 120.2 | 0.0872 | 416% |
| 8 | 0.0169 | 149.6 | 0.0739 | 337% |
| 9 | 0.0178 | 188.2 | 0.0814 | 357% |
| 10 | 0.0164 | 186.4 | 0.0862 | 426% |

After burst testing, patch samples were evaluated for persistence and swelling from the hydrated state following the burst test. The results are summarized in Table 7. Samples 1-5 were immersed in a PBS solution maintained at 37° C. These samples swelled 203 wt % on average over 24 hours. With this swelling following the hydration achieved at the conclusion of the burst test, the cumulative swelling from a dry state for patch samples 1-5 after about 24 hours was determined to be from 1412% to 1903%. Samples 1-5 were not visible after 114 hours (4.8 days). Samples 6-10 were immersed in a PBS solution maintained at 50° C. In this accelerated aging study, each of the samples had virtually disappeared at 24 hours.

TABLE 7

| Sample | Temperature | Mass, g | Mass after 24 Hours, g | Swelling after 24 Hours |
|---|---|---|---|---|
| 1 | 37° C. | 0.1004 | 0.3285 | 227% |
| 2 | 37° C. | 0.0847 | 0.243 | 187% |
| 3 | 37° C. | 0.0988 | 0.2966 | 200% |
| 4 | 37° C. | 0.0779 | 0.2556 | 228% |
| 5 | 37° C. | 0.0921 | 0.2527 | 174% |
| 6 | 50° C. | 0.0801 | x | N/A |
| 7 | 50° C. | 0.0872 | x | N/A |
| 8 | 50° C. | 0.0739 | x | N/A |
| 9 | 50° C. | 0.0814 | x | N/A |
| 10 | 50° C. | 0.0862 | x | N/A |

"x" indicates that the sample had virtually disappeared

The results show that biocompatible, absorbable patches with gel times of less than 30 seconds and burst pressures that exceed 140 mm Hg have been prepared. These patches also have been shown to have relatively high rates of swelling and overall degree of swelling yet a relatively short persistence of less than about 5 days. The results show that the test patches had similar persistence as compared to the isolated substrate (Substrate A). The results suggest that the precursor layer and the substrate can be tailored such that the persistence of both the resulting hydrogel layer and the substrate are similar. Alternatively, the precursor layer and/or the substrate can be tailored such that either the resulting hydrogel layer or the substrate has a shorter persistence time.

Example 3: Liver Defect Study 1 (with Comparative Examples)

This example evaluated a hemostatic patch prepared according to Example 1 for hemostasis in a porcine liver defect model. Comparisons were made to a commercially available fibrin sealant patch.

Part A. Test and Control Patches. Three hemostatic test patches prepared according to Example 1 using substrate type A ("Test Patch A"), substrate type B ("Test Patch B"), and substrate C ("Test Patch C"), respectively, were used in this study. A comparative fibrin sealant patch ("Control Patch A") from Baxter (TachoSil® Fibrin Sealant Patch, 0.5 cm×4.8 cm, Product Code 1144922) was purchased. Each patch was trimmed to approximately 2×2 cm size for application. The active face of the test patches was blue in color and the active face of the control patch was yellow in color.

Part B. Animal Defect Model Preparation. A single acute (Yorkshire) pig was opened along the anterior (ventral) midline and the liver isolated. The animal had the following specifics: weight (48.2 kg); sex (M); anticoagulation (ACT: 242). ACT was recorded prior to the first placement. Defects were created in both the left and right medial lobes of the liver. An 8 mm biopsy punch was used to penetrate the liver to a depth of approximately 4 mm. Metzenbaum scissors were then used to remove the plug created by the punch. At this point, bleeding was assessed using the Adam's scale, which is described in Adams et al, Journal of Thrombosis and Thrombolysis (2009) 28:1-5 (DOI 10.1007/s11239-008-2049-3), herein incorporated by reference. A target bleeding score of ≥3 per the Adam's scale was desired. (see FIG. 9). If the target score was not achieved, the biopsy punch was used to penetrate the liver again until the target score was attained. The bleeding score of the defect created for each trial was recorded as the initial score, as shown in Tables 8 and 9. The Test Patch A bleeding defects were severe (trials 2-1 and 2-2), moderate (trial 2-3), and slight (trial 2-4). The Control Patch A bleeding defects were severe (trials 2-1C and 2-2C), slight (trial 2-3C), and slight/moderate (trial 2-4C). The defect site bleeding was managed with clean, dry gauze prior to patch placement.

TABLE 8

| Test Patch A Trial | Initial Score | Score at 1 minute | Score at 3 minutes |
|---|---|---|---|
| 2-1 | 4 | 0 | 0 |
| 2-2 | 4 | 0 | 0 |
| 2-3 | 3 | 0 | 0 |
| 2-4 | 2 | 0 | 0 |
| Average: | 3.25 | 0 | 0 |

TABLE 9

| Control Patch A Trial | Initial Score | Score at 1 minute | Score at 3 minutes |
|---|---|---|---|
| 2-1C | 4 | 4 | 3 |
| 2-2C | 4 | 3 | 4 |
| 2-3C | 2 | 0 | 2 |
| 2-4C | 2.5 | 0 | 0* |
| Average: | 3.2 | 1.8 | 2.3 |

*There was puffiness under the patch.

Part C. Patch Evaluation Procedures and Results. A clean gauze was wetted using clean, sterile saline. A Test Patch A sample was placed backing down on wetted gauze such that the active face of the patch faced away from the gauze, although in general use the patch can be placed without the gauze to facilitate proper placement and then then gauze can be used to maintain some pressure while the patch is adhering. The gauze being used to manage the defect site bleeding was removed from the defect site. The patch was immediately placed over the defect site such that the active side of the patch was in contact with the defect and centered over the defect to the extent possible. With an open hand, firm and even pressure was applied with wet gauze to the backside of the patch and held for 1 minute (first interval). Then, the pressure was slowly reduced and the gauze was carefully removed from the backside surface of the applied patch. If there was any adherence of the gauze to the patch, a clean surgical instrument was gently applied to the edge of the patch or gentle irrigation was used to dissociate the gauze from the patch while minimizing disturbance. After a 30 second evaluation period, a 1 minute bleeding score was recorded based on the Adam's scale, as shown in Table 8. Then the wet gauze was again used to apply firm and even pressure to the backside of the patch for an additional 2 minutes. Again, the pressure was slowly reduced and the gauze was carefully removed from the backside surface of the applied patch. After a 30 second evaluation period, a 3 minute bleeding score was recorded based on the Adam's scale, as shown in Table 8. Then, a pair of forceps was used to gently pick at the edges of patch to test for adherence. The procedure was repeated with three additional defects for a total of four trials with Test Patch A. All of the test patch samples adhered well to the target site and were unaffected by the removal of the wetted gauze. Additionally, the edges of the test patch samples could not be pulled-up when pulled/picked at with a forceps. No weeping through any of the test patch samples was observed. The results show that all trials with Test Patch A achieved hemostasis within 1 minute after placement.

The above procedure was repeated for Control Patch A with some modifications. For Control Patch A Trials 2-3 and 2-4, the target bleeding score was lowered from ≥3 to ≥2 because of the poor performance of the control samples in trials 2-1C and 2-2C. The results are shown in Table 9. For Control Patch A Trial 2-4C at 3 minutes after placement, the bleeding score was recorded as 0, yet there was puffiness under the patch. When pressed, blood came from beneath the patch and the bleeding continued. This trial was considered to be non-hemostatic. The results show that none of the trials with Control Patch A achieved hemostasis at 3 minutes after placement in spite of the lowering of the target bleeding score for the second two trials. Furthermore, it was observed that the Control Patch A samples did not adhere to the target site and were easily dislodged. During the removal of the wetted gauze, extreme care was required not to disturb the patch from the placement site.

Test Patch B and Test Patch C were evaluated on the liver defects created for Control Patch A Trials 2-2C and 2-3C, respectively, after these control patch samples continued to allow severe or slight bleeding, respectively, at 3 minutes. The two test patch samples were able to restore hemostasis within 1 to 3 minutes, as shown in Table 10. Initial placement of Test Patch B was not centered on the defect. A second Test Patch B was placed on the defect at 1 minute after the initial placement. Hemostasis was achieved at 3 minutes after initial placement, corresponding to 2 minutes after the second placement.

TABLE 10

| Sample | Initial Score | Score at 1 minute | Score at 3 minutes |
|---|---|---|---|
| Test Patch B | 4 | 4* | 0 |
| Test Patch C | 2 | 0 | 0 |

*Initial placement was not centered on wound and a second Test Patch B was placed at 1 minute.

Part D. Additional Patch Evaluation. Test Patch A was additionally evaluated using a non-flat placement into a defect created using a scalpel on the surface of the liver. The channel-type defect was about 3 mm deep and about 5 mm long. Test Patch A was cut to a 2×4 cm size, wetted with saline, folded in half lengthwise and then placed within the defect. FIG. 10A shows Test Patch A after initial placement. Pressure was applied to the test patch sample using a wetted piece of gauze. Hemostasis was achieved at 1 minute in locations where the test patch was touching the defect, as shown in FIG. 10B. FIG. 10B also shows continued bleeding from an area of the defect that was not in contact with the test patch.

This example shows that the hemostatic patch prepared according to Example 1 significantly outperformed a commercially available fibrin sealant patch at achieving hemostasis at both 1 minute and 3 minutes after placement on a porcine liver defect. The reactive precursors in the hemostatic patch allowed for flat and non-flat placements and for a short period of manual compression after placement, resulting in a fast, adaptable, and easy to use patch for slight to severe bleeding defects of the liver.

Example 4: Liver Defect Study 2 (With Comparative Examples)

This example evaluated a hemostatic patch prepared according to Example 1 for hemostasis in a porcine liver defect model. Comparisons were made to a commercially available fibrin sealant patch.

Part A. Test and Control Patch. A set of hemostatic test patches prepared according to Example 1 using substrate type A ("Test Patch A") were used in this study. A comparative sealant patch embedded with human fibrinogen and human thrombin ("Control Patch B") from Johnson and Johnson (Evarrest® Fibrin Sealant Patch, 5.1 cm×10.2 cm, Product Code EVT5024) was purchased. Each patch was trimmed to approximately 2×2 cm size for application. The active face of the test patches was blue in color and the active face of the control patch was yellow in color.

Part B. Animal Defect Model Preparation. A single acute (Yorkshire) pig was opened along the anterior (ventral) midline and the liver isolated. The animal had the following specifics: weight (57.4 kg); sex (F); anticoagulation (ACT: 294). ACT was recorded prior to the first placement. Defects were created in both the left and right medial lobes of the liver. An 8 mm biopsy punch was used to penetrate the liver to a depth of approximately 4 mm. Metzenbaum scissors were then used to remove the plug created by the punch. At this point, bleeding was assessed. A target of ≥3 per the Adam's scale was desired. (see FIG. 9). If the target score was not achieved, the biopsy punch was used to penetrate the liver again until the target score was attained. The bleeding score of the defect created for each trial was recorded as the initial score, as shown in Tables 11 and 12. All of the Test Patch A bleeding defects were severe. The Control Patch B bleeding defects were moderate (trial 3-1C) or severe (trials 3-2C, 3-3C, and 3-4C). The defect site bleeding was managed with clean, dry gauze.

TABLE 11

| Test Patch A Trial | Initial Score | Score at 30 seconds | Score at 1 minute | Score at 3 minutes |
|---|---|---|---|---|
| 3-1 | 4 | 0 | 0 | 0 |
| 3-2 | 4 | 0 | 0 | 0 |
| 3-3 | 4 | 0 | 0 | 0 |
| 3-4 | 4 | 0 | 0 | 0 |
| Average: | 4 | 0 | 0 | 0 |

TABLE 12

| Control Patch B Trial | Initial Score | Score at 30 seconds | Score at 1 minute | Score at 3 minutes |
|---|---|---|---|---|
| 3-1C | 3 | 0.5 | 0.5 | 0.5 |
| 3-2C | 4 | 3 | 4 | 0.5 |
| 3-3C | 4 | 1 | 3* | 3 |
| 3-4C | 4 | 2 | 2 | 0** |
| Average: | 3.8 | 1.6 | 2.4 | 1 |

* Patch came off with gauze during hemostasis check.
**Patch subsequently fell off and wound required retreatment.

Part C. Patch Evaluation Procedures and Results. The procedure described in Example 2, Part C was followed for this example with the modification that a first scoring after 30 seconds was performed. All of the Test Patch A samples adhered well to the target site and were unaffected by the removal of the wetted gauze. Additionally, the edges of the Test Patch A samples could not be pulled-up when pulled/picked at with a forceps. No weeping through any of the Test Patch A samples was observed. As shown in Table 11, all trials with Test Patch A achieved hemostasis within 30 seconds after placement.

The results for Control Patch B are shown in Table 12. Only one Control Patch B sample (Control Patch B Trial 3-4C) achieved hemostasis after 3 minutes. However, later in the study, the patch became dislodged and bleeding resumed. The dislodged patch was later located in the chest cavity. The other three Control Patch B trials showed oozing (Control Patch B Trials 3-1C and 3-2C) or moderate bleeding (Control Patch BTrial 3-3C) at the 3 minute mark. During the removal of the wetted gauze, extreme care was required not to disturb the control patch. When evaluated at the 3 minute mark, it was observed that Control Patch B had adhered to the wound only in places that were actively bleeding. The control patch area that extended beyond the wound was not adhered to the tissue and remained as a loose/uplifted flap.

Part D. Additional Patch Evaluation. Test Patch A was additionally evaluated using multiple, non-flat (convex) placements onto a partially resected liver lobe. The placements were a pre-wetted 2×4 cm patch, a 2×4 cm dry patch, and a 2×2 cm dry patch. It was observed that the application of pressure to the dry patches was less difficult as compared to pre-wetted the pre-wetted patch since there was less slipping. Hemostasis of the entire defect was achieved after all three patches were placed. Each placement achieved hemostasis of the area in contact with the respective patch.

This example shows that the hemostatic patch prepared according to Example 1 significantly outperformed a commercially available fibrin/thrombin sealant patch at achieving hemostasis for moderate to severe bleeds at 30 seconds, 1 minute, and 3 minutes after placement on a porcine liver defect. In spite of the fibrin/thrombin sealant patch having a reactive species (thrombin), this patch did not actually seal the wound as the hemostatic patch did. Pick tests at edges of the hemostatic patch showed no delamination, whereas the fibrin/thrombin patches were only attached at the wound site. There was a dislodgement of the control patch in two of the four trials.

Example 5: Cardiovascular Defect Study

This example evaluated a hemostatic patch prepared according to Example 1 for hemostasis after various placements in a porcine cardiovascular defect model.

Part A. Test Patch. A set of hemostatic patches prepared according to Example 1 using substrate type A ("Test Patch A") were used in this study. All placements were done with the patch dry. The patches were made flexible after placement either by hydrating with saline directly to the patch or by applying pressure with a pre-wet gauze.

Part B. Animal Defect Model Initial Preparation. A single female, 60 kg, acute (Yorkshire) pig was used in this study. An incision was made in the skin over the ventral midline of the neck to expose the carotid artery. Blunt dissection was performed through underlying subcutaneous tissue and musculature. The muscles were retracted and the fascia around the target vessel was dissected from the vessel surface. Side branches of the vessels were ligated using silk suture material and clips. After obtaining proximal and distal control of the artery using vessel loops and vascular clamps, the vessel was temporarily occluded. An arteriotomy was performed and graft material (Gore Acuseal) was anastomosed in an end-to-end manner using non-absorbable sutures. When the anastomosis was completed, blow flow was re-established by removing the vessel loops and clamps.

An inguinal incision was made to expose each of the femoral arteries. Blunt dissection was performed through underlying subcutaneous tissue and musculature. The muscles were retracted and the fascia around the target vessel was dissected from the vessel surface. Side branches of the vessels were ligated using silk suture material and clips. After obtaining proximal and distal control of the artery using vessel loops and vascular clamps, the vessel was temporarily occluded.

Part C. Defect Creation, Patching Procedures, and Outcomes.

Procedure 1: Femoral Placement. The blood flow was stopped across a 3-5 cm portion of the left femoral artery using a clamp and a vessel loop. A 25-gauge needle was used to make 4 punctures of the vessel to simulate the suture line of a vessel repair procedure. The artery was unclamped to ensure that a bleeding defect had been created and to rate the bleed using the Adam's scale. The pulsatile bleed was determined to be severe (Adams' scale rating of 4). The artery was re-clamped to stop blood flow and the area was cleared of standing blood. Test Patch A was cut to approximately 1×1.7 cm. The dry test patch was placed on top of the defect site in such a manner as to cover the defect with the blue side facing the target bleed. Manual pressure was applied on the test patch using a pre-wetted piece of gauze for 30 seconds. Blood flow to the area was then restored by removing both the vessel loop and clamp. After the 30 seconds of manual pressure, the gauze was removed. The patch was assessed for hemostasis and adherence. Flow through the artery was confirmed by checking for a pulse on both sides of the placed patch. It was observed that the site was hemostatic 30 seconds after patch placement and that good adherence to the surrounding tissue was achieved. Approximately 1 hour after placement, the rear leg was "exercised" to simulate movement. The patch remained adhered to the defect and surround tissue during and after this movement. A pulse was found on both sides (distal and proximal) to the placed patch.

Procedure 2: Femoral Placement During Pulsatile Flow. Working at the same site as described in Procedure 1, a 25-gauge needle was used to make one puncture of the vessel proximal to the defect from Procedure 1. The pulsatile puncture bleed was determined to be severe (Adams' scale rating of 4). This puncture was immediately covered with manual pressure until patch placement was imminent. Manual pressure was removed and a dry, approximately 1.5×2 cm size patch was immediately placed on top of the active bleed site. Manual pressure was applied to the patch using a pre-wetted piece of gauze for 30 seconds. After the 30 seconds of manual pressure, the gauze was removed. The patch was assessed for hemostasis and adherence. Flow through the artery was confirmed by checking for a pulse on both sides of the placed patch. It was observed that the site was hemostatic 30 seconds after patch placement and that good adherence to the surrounding tissue was achieved. Approximately 1 hour after placement, the rear leg was "exercised" to simulate movement. The patch remained adhered to the defect and surround tissue during and after this movement. A pulse was found on both sides (distal and proximal) to the placed patch.

Procedure 3: Femoral Wrap Placement. The blood flow was stopped across a 3-5 cm portion of the right femoral artery using a clamp and a vessel loop. Using a scalpel, a small longitudinal defect along the artery was created. The defect was closed with 2-3 sutures. The bleeding defect was confirmed by removing the proximal clamp and was rated as a severe pulsatile bleed. The clamp was reapplied to stop blood flow and the area was cleared of standing blood. A dry patch was placed under the defect site with the blue side facing up. The patch was then hydrated with saline and wrapped around the defect site to contact the blue side with the target bleed. Manual pressure was held on the patch using a pre-wetted piece of gauze for 30 seconds. After the 30 seconds of manual pressure, the gauze was removed. The patch was assessed for hemostasis and adherence. Flow through the artery was confirmed by checking for a pulse on both sides of the placed patch. It was observed that the site was hemostatic 30 seconds after patch placement and that good adherence to the surrounding tissue was achieved. Approximately 15 minutes after placement, the rear leg was "exercised" to simulate movement. The patch remained adhered to the defect and surround tissue during and after this movement. A pulse was found on both sides (distal and proximal) to the placed patch.

Procedure 4: Placement on a Bleeding Suture Line. The animal was administered heparin and this procedure was completed with anticoagulated blood. The right carotid artery was isolated and graft material (Gore Acuseal, ECH060020A) was anastomosed in an end-to end manner. With active blood flow through the artery and graft material, a bleeding area was created by manipulating/removing sutures at the distal anastomosis. The bleeding was assessed using the Adam's scale to be a 3 (moderate). Two pieces (2×2 cm) of Test Patch A were placed along the suture line patch to cover the defect with the blue side facing the target bleed. Manual pressure using a pre-wetted piece of gauze and manual pressure was held for 30 seconds. After the 30 seconds of manual pressure, the gauze was removed and the patch was assessed for hemostasis and adherence. After 30 seconds, hemostasis was achieved. The patch adhered to the suture line but adhered only minimally to the graft material. It was observed that the sealing of the suture line worked as well after anticoagulation as prior to anticoagulation.

Procedure 5: Placement on a Graft Defect. This procedure was completed with anticoagulated blood. Working at the same site as described in Procedure 4, a 14-gauge needle was used to puncture the graft material. This puncture was assessed to ensure a steady, moderate flow of blood from the defect (Adams' score of 3). Test Patch A was placed over the graft defect. Manual pressure was applied to the patch using a pre-wetted piece of gauze for 30 seconds. After the 30 seconds of manual pressure, the gauze was removed. The patch was assessed for hemostasis and adherence. After 30 seconds, onset of sealing of the target bleed was observed. Adherence of the patch to the graft material was observed to be minimal. The patch was able to be pulled off of the bleeding site with a forceps.

This study showed that placements of Test Patch A successfully sealed defects typically seen in cardiovascular procedures, including pulsatile femoral perforations as well as on end-to-end anastomoses between the carotid artery and graft material. All applications of Test Patch A achieved hemostasis (or sealing) at or before 30 seconds after placement. The patch remained stable and adherent to tissue at the placement site after flexion of the rear limbs. The patch successfully controlled bleeding from a graft material. Additionally, the patch sealing performance remained consistent after the administration of heparin to the animal.

Example 6: Orthopedic and Cardiovascular Defect Study

This example evaluated a hemostatic patch prepared according to Example 1 for hemostasis after various placements in an acute, non-GLP porcine orthopedic and cardiovascular defect model.

Part A. Test Patch. A set of hemostatic patches prepared according to Example 1 using substrate type A ("Test Patch A") were used in this study. All placements were done with the patch dry and pressure applied via a wetted gauze. Both 2×2 cm and 2×4 cm patches were used. The patches were made flexible after placement by applying pressure with a pre-wet gauze.

Part B. Animal Defect Model Initial Preparation. A single male, 27 kg, acute (Yorkshire) pig was used in this study. An incision was made in the skin to expose the tibial diaphysis. Blunt dissection was then performed through underlying subcutaneous tissue and musculature. The muscles were retracted and the fascia around the target site was dissected from the bone surface. A dental drill with an approximately 2-3 mm ball tip bit was used to create a target cortical bleeding defect. The defect was irrigated with saline to remove debris and avoid tissue heating during creation.

Then, an incision was made in the skin to expose the femoral condyle. Blunt dissection was then performed through underlying subcutaneous tissue and musculature. The muscles were retracted and the fascia around the target site was dissected from the bone surface. A dental drill with an appropriately 2-3 mm ball tip bit used to create a target cortical bleeding defect. The defect was irrigated with saline to remove debris and avoid tissue heating during creation.

Finally, an inguinal incision was made to expose each of the femoral arteries. Blunt dissection was performed through underlying subcutaneous tissue and musculature. The muscles were retracted and the fascia around the target vessel was dissected from the vessel surface. Side branches of the vessels were ligated using silk suture material and clips. After obtaining proximal and distal control of the artery using vessel loops and vascular clamps, the vessel was temporarily occluded.

All assessments of bleeding were made using the Adams' scale.

Part C. Defect Creation, Patching Procedures, and Outcomes.

Procedure 1: Tibial Diaphysis Defect. A dental drill and ball drill bit were used to make a defect ~3 mm in diameter and ~4 mm deep in the tibial diaphysis. Bleeding was confirmed and assessed as very slight (Adams' score of 1). The patch was cut into an approximately 1×2 cm piece. The patch was placed in such a manner as to cover the defect with the blue side facing the target bleed. Manual pressure was applied on the patch using a pre-wetted piece of gauze for 30 seconds. After the 30 seconds of manual pressure, the gauze was removed. The patch was assessed for hemostasis and adherence. It was observed that the site was sealed 30 seconds after patch placement. As the site was observed over time, there was evidence of continued bleeding under the patch yet the site remained sealed and the patch remained well adhered.

Procedure 2: Tibial Diaphysis Larger Defect. Working at the same site as described in Procedure 1, a dental drill and ball drill bit were used to make a larger defect (~6 mm in diameter and ~9 mm deep) in the tibial diaphysis. Bleeding was confirmed and assessed as very slight (Adams' score of 1). A 2×2 cm piece of the patch was cut into discs to match the size of the defect by using a 6 mm biopsy punch. Two of these discs were placed within the defect using forceps with the blue side of the first patch facing the target bleed at the bottom of the defect. Each ensuing patch was stacked on top of the previous with the blue side against the previous patch. These were placed to address the bleeding from the walls of the created defect. Manual pressure was applied for 30 seconds to the top patch using a pre-wetted piece of gauze. After the 30 seconds of pressure, the gauze was removed. The site was assessed for hemostasis and adherence of the patches. It was observed that hemostasis was achieved at 30 seconds after patch placement.

Procedure 3: Femoral Condyle Defect. A dental drill and ball drill bit were used to make a defect ~6 mm in diameter and ~3 mm deep in the femoral condyle. Bleeding was confirmed and assessed as very slight (Adams' score of 1). A 2×2 cm piece of Test Patch A was cut into a disc to match the size of the defect using a 6 mm biopsy punch. This disc was placed within the defect using forceps with the blue side of the patch facing the target bleed. Pressure was applied on the patch using a pre-wetted piece of gauze using the plunger from a 1 ml syringe for 30 seconds. After the 30 seconds of pressure, the gauze was removed. The site was assessed for hemostasis and adherence of the patches. It was observed that hemostasis was achieved at 30 seconds after patch placement.

Procedure 4: Femoral Condyle Deeper Defect. A dental drill and ball drill bit were used to make a defect ~6 mm in diameter and ~9 mm deep in the femoral condyle. Bleeding was confirmed and assessed as slight (Adams' score of 2). A 2×2 cm piece of Test Patch A was cut into discs using a 6 mm biopsy punch. Four of these discs were placed in such a manner as to fit within the defect with the blue side of the first patch facing the target bleed at the bottom of the defect. Each ensuing patch was stacked on top of the previous with the blue side against the previous patch. These were placed to address the bleeding from the walls of the created defect. Pressure was applied on the patch using a pre-wetted piece of gauze using the plunger from a 1 ml syringe for 30 seconds. After the 30 seconds of pressure, the gauze was removed. The site was assessed for hemostasis and adherence of the patches. It was observed that hemostasis was achieved at 30 seconds after patch placement.

Procedure 5: Femoral Artery Suture Line Defect. The blood flow was stopped across a 3-5 cm portion of the femoral artery using a clamp and a vessel loop. A 25-gauge needle was used to make two punctures of the vessel to simulate the suture line of a vessel repair procedure. The artery was unclamped to ensure that a bleeding defect has been created and to rate the bleed using the Adams scale. The pulsatile bleeding was assessed as severe (Adams' score of 4). The artery was re-clamped to stop blood flow and the area was cleared of standing blood. A piece of gauze was cut and wet with clean saline. A 2×4 cm patch was placed on top of the wetted gauze with the blue side away from the gauze. The patch/gauze pair was then slid underneath the artery with the blue side of the patch facing the target bleed. The ends of the gauze were held by the user and lifted towards each other until the gauze ends were in contact. Then, pressure was applied to the areas of patch-patch contact ("tails") to result in the central area of the patch being wrapped around the vessel and the tails of the patch being adhered to each other. Care was taken to ensure that the channel formed by the two tails was not directly over the bleeding site. Manual pressure was then applied on the patch through the gauze for 30 seconds. After the 30 seconds of manual pressure, the gauze was removed. Blood flow to the area was then restored by removing both the vessel loop and clamp. Flow through the artery was confirmed by checking for a pulse on both sides of the placed patch. The patch was then assessed for hemostasis and adherence. The tails of the patch were trimmed with Metzenbaum scissors so that an approximately 2-3 mm tail remained along the length of the patched section of the artery. It was observed that the application site was hemostatic at the 30 second mark, good adherence to the artery was achieved, and a pulse was found on both the distal and proximal sides of the patch.

Procedure 6: Contralateral Femoral Artery Defect. The procedure described in Procedure 5 was applied to the contralateral femoral artery. The pulsatile bleeding defect created was assessed as severe (Adams' score of 4). Again, it was observed that the application site was hemostatic at the 30 second mark, good adherence to the artery was achieved, and a pulse was found on both the distal and proximal sides of the patch.

An additional study evaluated Test Patch A in a chronic ovine carotid arteriotomy with patch closure model. After 7 days implantation in the model, Test Patch A resulted in stable vascular repair without any indication of hemorrhage via angiographic assessments.

This study showed that placements of Test Patch A successfully sealed both condyle and diaphysis bone defects with very slight to slight bleeding as well as bilateral pulsatile femoral artery defects with severe bleeding. In each case, hemostasis (or sealing) was achieved at or before 30 seconds after placement of a dry patch. A syringe plunger was successfully used to apply pressure to patches placed in the deeper bone defects. An alternative wrapping-type placement method was successfully used to treat the pulsatile femoral artery perforations.

Example 7: Combined Soft Organ and Orthopedic Defect Study

This example illustrates the use of both soft organ and orthopedic surgical patches in a patient.

Part A. Test Patches and Control Products. Three types of hemostatic patches prepared according to Example 1 using substrate type A ("Test Patch A"), substrate type B ("Test Patch B"), and substrate C ("Test Patch C"), respectively, were used in this study. The control product was a 2 mm thick water-insoluble porcine gelatin sponge (Surgifoam® Absorbable Gelatin Sponge, Johnson and Johnson, product code 1975), to which recombinant thrombin (Baxter, Recothrom®) was added ("Control Patch C"). Both dry and pre-wet placements were tried with each sample.

Part B. Animal Defect Model Preparation. In a training laboratory setting, a surgeon was provided with the patches described in Part A. A single acute (Yorkshire) pig was opened along the anterior (ventral) midline and the liver isolated. The animal had the following specifics: weight (48.2 kg); sex (M); anticoagulation (ACT: 242). ACT was recorded prior to the first placement. Defects were created in both the left and right medial lobes of the liver and in the spleen. An 8 mm biopsy punch was used to penetrate each organ initially to a target depth of approximately 7 mm. Later, a target depth of approximately 2 mm was used. Metzenbaum scissors were then used to remove the plug created by the punch. At this point, bleeding was assessed. A target of ≥3 per the Spot Grade SBSS was desired. If the target bleeding score was not achieved, the biopsy punch was used to penetrate the organ again until the target score was attained. Bleeding defect were moderate to severe. The defect site bleeding was managed with clean, dry gauze prior to product placement.

Part C. Patch Evaluation Procedures and Results. A clean gauze was wetted using clean, sterile saline. A test patch sample was placed backing down on the wetted gauze such that the blue surface the patch faced away from the gauze. The gauze managing the bleeding was removed from defect site. The patch was immediately placed over the defect site such that the blue side of the patch was in contact with the defect and centered over the defect to the extent possible. With an open hand, firm and even pressure was applied with wet gauze to the backside of the patch and held for 30 seconds. Then, the pressure was carefully reduced and the gauze was carefully removed from the backside surface of the applied patch. If any adherence of the gauze to the patch, a clean surgical instrument was gently applied to the edge of the patch or gentle irrigation was used to dissociate the gauze from the patch while minimizing disturbance. After a 30 second evaluation period, a 30-second bleeding score was recorded based on the Spot Grade SBSS. Then, a pair of forceps was used to gently pick at the edges of the patch to test for adherence. The procedure was repeated for each patch sample. A modified procedure was used for each patch sample in which the patches were placed without pre-wetting with gauze.

Part D. Observations.

Test Patch A resulted in hemostasis with every application. Sealing of the defect was more effective when pressure was applied into the hollow defect and when the patch was pre-wet rather than applied dry over the hollow core organ defect. Application of a pre-wet patch resulted in no bulging/doming of the patch and no red core of blood forming on the patch over the hollow core defect. Test Patch B provided similar results as Test Patch A and resulted in hemostasis with every application. The application success for Test Patch A and B improved with surgeon experience with the patches as well as the length of time after patch placement. Multiple samples of Test Patch C were tried, but in each case the patch stuck to the gauze during placement. The removal of the gauze caused tearing of the substrate which resulted in re-bleeding. Control Patch C was successfully used to create hemostasis in both the liver and the spleen. However, Control Patch C was poorly adhered to the tissue and there was a concern by the surgeons pertaining to a high risk of dislodgement of the product. Both the test patches and the control patches showed a "dome effect" due to swelling of blood under the patch/product at the defect site. By providing pressure to the applied patch/product the dome effect was generally avoided.

The results showed that Test Patch A and Test Patch B provided good adhesion to the tissue and rapid hemostasis in a relatively easy to use patch. Test Patch C was unable to achieve sustained hemostasis with the process used. Too much porosity in the substrate of Test Patch C is thought to be associated with too much flow of blood from the defect through the active face and into the substrate since the hydrogel can migrate through a highly porous substrate. This study showed that the active face composition used with a suitable substrate contribute to the performance and usability of the patch. Control Patch C failed to achieve good adherence to the tissue.

Example 8: Simulated Cervical Defect Study

This example illustrates the use of a cone shaped mandrel for creating hemostasis in a simulated cervical defect.

Part A. Test Patches. A set of conical shaped hemostatic patches prepared according to the general procedure of Example 1 using substrate type A. The patches were further shaped into cones via a series of manufacturing steps as follows: A patch was cut along a side to about the center of the patch. It was then heated slightly and contoured to a roughly conical shape. The overlapping cut portions were then held together to secure the shape until the PEG had cooled.

Part B. Animal Defect Model Preparation. A single acute (Yorkshire) pig was opened to isolate the abdominal porcine wall. Anticoagulation (ACT) was over 300 prior to the first placement. An 8 mm biopsy punch was used to penetrate the abdominal side wall to a target depth of approximately 7 mm. Metzenbaum scissors were then used to remove the plug created by the punch. At this point, bleeding was assessed. A bleed of 3 on the Spot Grade SBSS scale was achieved. The defect site bleeding was managed with clean, dry gauze prior to product placement.

Part C. Patch Evaluation Procedures and Results. A test patch sample was placed upon the defect such that the blue surface of the conical patch faced the defect. Holding the handle of the mandrel, the cone shaped portion of the mandrel with the conical patch was pressed into the defect. Gentle but constant pressure was applied to the patch via the mandrel for 30 seconds. Then, the pressure was carefully reduced and the mandrel was carefully removed from the convex (backside) surface of the applied patch. Some adherence of the patch to the mandrel was observed and a clean surgical instrument was used to dissociate the mandrel from the patch while minimizing disturbance. After a 30 second evaluation period, a hemostasis was assessed. A modified procedure was used in a second application in which a piece of wetted gauze was placed between the conical patch and the mandrel prior to pressing the patch into the defect with the mandrel. No adherence of the patch to the mandrel or to the gauze was observed during removal of the mandrel and the gauze from the applied patch. After a 30 second evaluation period, hemostasis was assessed.

Part D. Observations.

Hemostasis and good adherence of the patch to the defect was achieved with both applications at 30 seconds. While the adhesion of the patch to the mandrel in the first application caused a loss of hemostasis upon removal of the mandrel, the modified placement procedure used with the second application resulted in hemostasis being maintained after the mandrel was removed. The results showed that a shaped mandrel could be used to install a pre-shaped patch at a site that is not easily accessible for direct manual application ("a remote site"). The results also showed that pre-shaped patches and correspondingly shaped mandrels can be advantageously used to aide in alignment, placement, and application of pre-shaped patches into both remote sites and non-remote sites. The shaped mandrels allow for application of more consistent pressure to the entire surface of the pre-shaped patch which is in contact with the defect. The application of consistent pressure promotes rapid hemostasis by reducing the potential for bleeding beneath the patch. Based on the study results, it is expected that a conical shaped patch with a corresponding cone shaped mandrel would be suitable to use to achieve hemostasis of a cervical bleeding defect, such as illustrated in FIGS. 12A and 12B.

Further Inventive Concepts

1. A medical patch comprising a biocompatible substrate and a dry hydrogel precursor layer on the substrate, the dry hydrogel precursor layer comprising a PEG-electrophilic hydrogel precursor having a plurality of arms having terminal reactive electrophilic groups and a PEG-nucleophilic hydrogel precursor having a plurality of arms having terminal protonated amine groups and no more than about 2 weight percent water and wherein both the PEG-electrophilic hydrogel precursor and the PEG-nucleophilic hydrogel precursor are substantially uncrosslinked, wherein the dry hydrogel precursor layer forms a crosslinked hydrogel in no more than 5 minutes upon hydration with a physiological solution.

2. The medical patch of further inventive concept 1 wherein the substrate is biodegradable and comprises gelatin and partially thermally crosslinked, wherein the substrate is a foam, a non-woven tufted material, or a non-woven felted material and persists for less than 2 weeks in an in vitro physiological solution maintained at 37° C.

3. The medical patch of further inventive concept 1 wherein the dry hydrogel precursor layer comprises multiple layers of a blend of the PEG-electrophilic hydrogel precursor and the PEG-nucleophilic hydrogel precursor or a stack of one or more sublayers of the PEG-electrophilic hydrogel precursor with one or more sublayers of the PEG-nucleophilic hydrogel precursor, wherein adjacent sublayers are directly contacting each other, and wherein the medical patch has a width and length that are independently from about 1 cm to about 15 cm and a thickness from about 0.5 mm to about 5 mm.

4. The medical patch of further inventive concept 1 wherein the PEG-electrophilic hydrogel precursor and the PEG-nucleophilic hydrogel precursor independently have a molecular weight of about 10K Da to about 25K Da and from 4 to 8 arms, and wherein the reactive electrophilic groups comprise an ester.

5. A wound filing composition comprising a quantity of a shredded material from a patch of further inventive concept 1.

6. A method for forming a medical patch, the method comprising
applying one or more layers of a liquid onto a porous hydrophilic substrate in a dry atmosphere to form a hydrogel precursor layer on the porous hydrophilic substrate, wherein the hydrogel precursor layer comprises a blend of an electrophilic hydrogel precursor and a protected nucleophilic hydrogel precursor, or a stack of sublayers of, respectively, the electrophilic hydrogel precursor and the protected nucleophilic hydrogel precursor wherein adjacent sublayers are directly contacting each other, wherein the protected nucleophilic hydrogel precursor comprises an acidified amine, wherein the liquid comprises the electrophilic hydrogel precursor and/or the protected nucleophilic hydrogel precursor and wherein the liquid comprises a melt or a non-aqueous solution of the electrophilic hydrogel precursor and/or the protected nucleophilic hydrogel precursor.

7. The method of further inventive concept 6 wherein the temperature of the liquid no more than about 95° C.

8. The method of further inventive concept 6 further comprising drying the porous hydrophilic substrate prior to applying.

9. The method of further inventive concept 8 wherein the drying is performed until the porous hydrophilic substrate has a moisture content of no more than about 2 weight percent water.

10. The method of further inventive concept 6 wherein the applying comprises slot-die coating, doctor blading, jetting, or spraying.

11. The method of further inventive concept 6 wherein the medical patch is no more than about 5 mm in thickness.

12. The method of further inventive concept 6 further comprising radiation sterilizing the medical patch.

13. The method of further inventive concept 6 further comprising forming the medical patch into a three dimensional contoured shape after applying one or more layers of the liquid.

14. A method for using a medical patch, the method comprising:
placing one or more medical patches on or in a bleeding defect associated with an organ, wherein the medical patch comprises a biocompatible substrate and an initially dry, substantially uncrosslinked hydrogel precursor layer on the substrate, wherein the layer comprises an electrophilic-hydrogel precursor and a nucleophilic precursor as a blend or in multiple stacked sublayers that directly contact each other.

15. The method of further inventive concept 14 wherein the one or more medical patches are provided in a single-use pharmaceutical packaging having a high moisture barrier, and/or a desiccant.

16. The method of further inventive concept 14 further comprising contouring the one or more medical patches to have a three dimensional shape that corresponds to an interior of the bleeding defect.

17. The method of further inventive concept 14 wherein the organ is a bone, a gland, a digestive organ, a pulmonary organ, a urinary organ, a reproductive organ, a vessel, an interface with a natural or synthetic graft, or a combination thereof.

18. The method of further inventive concept 14 wherein the bleeding defect is a suture line, a puncture wound, a bullet wound, a cavity, a gouge, a biopsy punch hole, a graft interface, or a combination thereof.

19. The method according to further inventive concept 14 wherein the placing is performed without pre-wetting the one or more medical patches.

20. The method according to further inventive concept 14 further comprising wetting the one or more medical patches with unbuffered water or unbuffered saline prior to placing and/or after placing.

21. The method according to further inventive concept 14 wherein the placing comprises placing the one or more medical patches on the bleeding defect in a non-flat geometry.

22. The method according to further inventive concept 14 wherein the placing comprises wrapping the one or more medical patches around the organ.

23. The method according to further inventive concept 22 wherein the organ is an artery or a vein and wherein the organ is natural, grafted, or a combination thereof.

24. The method according to further inventive concept 14 wherein the placing comprises directing the medical patch on or in a bleeding defect with a tubular applicator, wherein the medical patch has a three dimensional contoured shape.

25. The method according to further inventive concept 24 wherein the tubular applicator has a shape that couples with the three dimensional shape of the medical patch.

26. The method according to further inventive concept 24 wherein the tubular applicator has a conical shaped end and the three dimensional shape of the medical patch is a cone, wherein placing comprises using the tubular applicator to transvaginally direct the medical patch into the cervix.

27. The method according to further inventive concept 14 wherein the placing comprises placing one or more first medical patches on the bleeding defect and then placing one or more second medical patches overlapping at least a portion of the one or more first medical patches.

28. The method according to further inventive concept 14 wherein the placing further comprises applying manual pressure to the one or more medical patches for no more than about 2 minutes.

29. The method according to further inventive concept 14 wherein the placing results in hemostasis within about 5 minutes.

30. The method according to claim 29 wherein the bleeding defect has an Adam's score of 1 to 4.

31. The medical patch of further inventive concept 14 wherein contact with physiological fluids associated with the organ results in the layer forming a hydrogel in no more than about 2 minutes, wherein the hydrogel adheres to the organ.

32. The method according to further inventive concept 14 wherein the one or more medical patches have a width and length that are independently from about 1 cm to about 15 cm, wherein within about 5 minutes after placing the edges of the one or more medical patches adhere to the organ.

33. The method according to further inventive concept 14 wherein the bleeding defect comprises blood that has been anticoagulated.

34. The method according to further inventive concept 14 wherein the one or more medical patches are fully absorbed in no more than about 28 days.

35. The method according to further inventive concept 14 wherein the one or more medical patches remain at least partially adhered to the organ until the one or more medical patches essentially are fully absorbed.

36. The method according to further inventive concept 14 wherein the one or more medical patches has a gel time at 37° C. of no more than about 5 minutes, wherein the gel time is measured in vitro using a texture analyzer to generate a force versus time plot immediately after activation of the patch with a buffer solution having a pH of 8, wherein the gel time is the time that corresponds with the lowest force on the plot.

37. The method according to further inventive concept 14 wherein the one or more patches have a burst pressure of at least about 50 mm Hg.

38 A granular composition comprising a blend of a porous hydrophilic material and hydrogel precursors comprising an electrophilic-hydrogel precursor having a plurality of electrophilic functional groups and a nucleophilic-hydrogel precursor having a plurality of protonated amine groups and no more than about 2 weight percent water, wherein both the electrophilic-hydrogel precursor and the nucleophilic-hydrogel precursor are substantially uncrosslinked and are in the same granules, or distinct granules, or a combination thereof.

39. The granular composition of further inventive concept 38 wherein the porous hydrophilic material and the hydrogel precursors form composites within granules.

40. The granular composition of further inventive concept 38 wherein the porous hydrophilic material, and the electrophilic-hydrogel precursor or the nucleophilic-hydrogel precursor form composites within granules.

41. The granular composition of further inventive concept 38 wherein the porous hydrophilic material and a composite of the hydrogel precursors are in distinct granules.

42. The granular composition of further inventive concept 38 wherein the porous hydrophilic material, the electrophilic-hydrogel precursor, and the nucleophilic-hydrogel precursor are in distinct granules.

43. The granular composition of further inventive concept 38 wherein the porous hydrophilic material, the electrophilic-hydrogel precursor, the nucleophilic-hydrogel precursor, or a blend of the electrophilic-hydrogel precursor and the nucleophilic-hydrogel precursor at least partially coat the porous hydrophilic material.

44. The granular composition of further inventive concept 39 comprising from 10 wt % to 75 wt % of the porous hydrophilic material, wherein the ratio of electrophilic functional groups to protonated amine groups is approximately 1.

45. A granular composition of further inventive concept 38 wherein the porous hydrophilic material comprises two or more materials.

46. The granular composition of further inventive concept 38 comprising granules having an average diameter from about 0.001 mm to about 2 mm.

47. The granular composition of further inventive concept 38 comprising a powder.

48. The granular composition of further inventive concept 38 further comprising a visualization agent and/or a therapeutic agent.

49. A method for using the granular composition of further inventive concept 38 comprising:

placing the granular composition on or in a bleeding defect.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understood that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. A medical patch comprising a biocompatible substrate and a dry hydrogel precursor layer on the substrate, the dry hydrogel precursor layer comprising an electrophilic-hydrogel precursor having a plurality of electrophilic functional groups and a nucleophilic-hydrogel precursor having a plurality of protonated amine groups and no more than about 2 weight percent water and wherein both the electrophilic-hydrogel precursor and the nucleophilic-hydrogel precursor are substantially uncrosslinked, and are blended or in direct contact with each other.

2. The medical patch of claim 1 wherein the dry hydrogel precursor layer comprises a blend of the electrophilic-hydrogel precursor and the nucleophilic-hydrogel precursor.

3. The medical patch of claim 1 wherein the substrate persists for less than 30 days in an in vitro physiological solution maintained at 37° C.

4. The medical patch of claim 1 wherein the substrate persists for less than 2 weeks in an in vitro physiological solution maintained at 37° C.

5. The medical patch of claim 1 wherein the substrate is capable of absorbing from 300 wt % to 3000 wt % water.

6. The medical patch of claim 1 wherein the substrate comprises gelatin.

7. The medical patch of claim 6 wherein the substrate is partially thermally crosslinked and wherein the substrate is a foam, a non-woven tufted material, or a non-woven felted material.

8. The medical patch of claim 1 wherein the dry hydrogel precursor layer comprises multiple layers of a blend of the electrophilic-hydrogel precursor and the nucleophilic-hydrogel precursor.

9. The medical patch of claim 8 wherein the dry hydrogel precursor layer is formed from a neat melt blend of the electrophilic-hydrogel precursor and the nucleophilic-hydrogel precursor.

10. The medical patch of claim 1 wherein the dry hydrogel precursor layer comprises a stack of one or more sublayers of the electrophilic-hydrogel precursor with one or more sublayers of the nucleophilic-hydrogel precursor, wherein adjacent sublayers are directly contacting each other.

11. The medical patch of claim 1 wherein the substrate consists essentially of gelatin and the dry hydrogel precursor layer consists of a single solid layer consisting essentially of the electrophilic-hydrogel precursor, the nucleophilic-hydrogel precursor, and an optional visualization agent, wherein the visualization agent is biocompatible.

12. The medical patch of claim 1 wherein the electrophilic-hydrogel precursor has a first hydrophilic core comprising a polymer having a molecular weight of at least about 5000 Da and wherein the nucleophilic-hydrogel precursor has a second hydrophilic core comprising a polymer having a molecular weight of at least about 2500 Da.

13. The medical patch of claim 12 wherein the first hydrophilic core and the second hydrophilic core independently have a molecular weight from about 10K Da to about 25K Da and from 4 to 8 arms.

14. The medical patch of claim 12 wherein the first hydrophilic core and/or the second hydrophilic core comprise polyethylene glycol, polyvinyl alcohol, polyoxazoline, copolymers thereof, or mixtures thereof or other water soluble medically acceptable polymers with functional groups that can be modified, wherein the first hydrophilic core and the second hydrophilic core comprise the same polymer.

15. The medical patch of claim 1 wherein the plurality of arms for the electrophilic-hydrogel precursor and for the nucleophilic-hydrogel precursor are independently from 3 to 8 and wherein the first hydrophilic core and the second hydrophilic core comprise polyethylene glycol.

16. The medical patch of claim 1 wherein the electrophilic-hydrogel precursor has electrophilic functional groups comprising an ester.

17. The medical patch of claim 16 wherein the ester is a succinimidyl ester.

18. The medical patch of claim 1 wherein the ratio of electrophilic functional groups to protonated amine groups is no more than about 1.

19. The medical patch of claim 1 wherein the ratio of electrophilic functional groups to protonated amine groups is approximately 1.

20. The medical patch of claim 1 wherein the ratio of electrophilic functional groups to protonated amine groups is about 0.95 to about 1.05.

21. The medical patch of claim 1 wherein the electrophilic-hydrogel precursor and the nucleophilic-hydrogel precursor are each water soluble.

22. The medical patch of claim 1 wherein the medical patch further comprises a therapeutic agent.

23. The medical patch of claim 1 wherein the therapeutic agent comprises an analgesic, an anesthetic, a steroid, an antibiotic, a steroid, an anti-infective, an anti-inflammatory drug, a non-steroidal anti-inflammatory drug, an anti-proliferative, or combinations thereof.

24. The medical patch of claim 1 wherein the dry hydrogel precursor layer further comprises a visualization agent.

25. The medical patch of claim 24 wherein the visualization agent is biocompatible and comprises a coloring agent, a fluorescent molecule, a contrast agent, or a combination thereof.

26. The medical patch of claim 24 wherein the medical patch has a first side comprising the substrate and a second side comprising the dry hydrogel precursor layer and the visualization agent, wherein the first side is essentially free of the visualization agent.

27. The medical patch of claim 1 wherein the medical patch is flexible and conformable when dry.

28. The medical patch of claim 27 wherein the patch can be rolled for laparoscopic delivery through a trocar.

29. The medical patch of claim 1 wherein the medical patch has a thickness from about 0.5 mm to about 5 mm and a width and length that are independently from about 1 cm to about 15 cm.

30. The medical patch of claim 1 wherein the medical patch is free of blood components and human components.

31. The medical patch according to claim 1 wherein contact with physiological fluids associated results in the dry hydrogel precursor layer forming a hydrogel.

32. The medical patch of claim 1 wherein the substrate when dry or wet is non-adhesive to surgical gloves or gauze wetted with a non-buffered solution.

33. The medical patch of claim 1 wherein the medical patch has a storage stability against significant gelation of a least about 1 year at refrigerated conditions.

34. The medical patch of claim 1 wherein contact with physiological fluids results in full absorption of the medical patch in no more than about 28 days.

35. The medical patch of claim 1 wherein contact with physiological fluids results in full absorption of the medical patch in no more than about 9 days.

36. The medical patch of claim 1 wherein the medical patch has a three dimensional contoured shape.

37. The medical patch of claim 36 wherein the three dimensional shape is a standard cone or a truncated cone.

38. A wound filing composition comprising a quantity of a shredded material from a patch of claim 1.

39. The medical patch of claim 1 wherein the dry hydrogel precursor layer has no added buffer.

* * * * *